(12) United States Patent
Wang

(10) Patent No.: US 10,299,267 B2
(45) Date of Patent: May 21, 2019

(54) DATA TRANSMISSION METHOD AND USER EQUIPMENT

(71) Applicant: HUAWEI TECHNOLOGIES CO., LTD., Shenzhen, Guangdong (CN)

(72) Inventor: Jian Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 97 days.

(21) Appl. No.: 15/500,360

(22) PCT Filed: Aug. 1, 2014

(86) PCT No.: PCT/CN2014/083548
§ 371 (c)(1),
(2) Date: Jan. 30, 2017

(87) PCT Pub. No.: WO2016/015332
PCT Pub. Date: Feb. 4, 2016

(65) Prior Publication Data
US 2017/0223706 A1 Aug. 3, 2017

(51) Int. Cl.
*H04W 72/04* (2009.01)
*H04W 72/12* (2009.01)

(52) U.S. Cl.
CPC ....... *H04W 72/0446* (2013.01); *H04W 72/04* (2013.01); *H04W 72/1205* (2013.01); *Y02D 70/00* (2018.01); *Y02D 70/1224* (2018.01); *Y02D 70/1242* (2018.01); *Y02D 70/1262* (2018.01); *Y02D 70/146* (2018.01); *Y02D 70/21* (2018.01); *Y02D 70/23* (2018.01)

(58) Field of Classification Search
None
See application file for complete search history.

(56) References Cited

FOREIGN PATENT DOCUMENTS

| CN | 102547871 A | 7/2012 |
|----|----|----|
| CN | 103686753 A | 3/2014 |
| WO | 2013/073853 A1 | 5/2013 |

OTHER PUBLICATIONS

Ericsson, "On scheduling assignments", 3GPP TSG-RAN WG1 Meeting #77, Seoul, South Korea, May 19-23, 2014, R1-142400 (Year: 2014).*

(Continued)

*Primary Examiner* — Joseph A Bednash
(74) *Attorney, Agent, or Firm* — Staas & Halsey LLP

(57) ABSTRACT

Embodiments of the present invention provide a data transmission method and user equipment. The method includes: obtaining, by first user equipment, time resource grouping information, where the time resource grouping information includes time resource numbers in N time resource groups, and N is a positive integer; sending, by the first user equipment, an indication signal, where the indication signal indicates one or more time resource numbers; determining, by the first user equipment according to the time resource grouping information and the one or more time resource numbers indicated by the indication signal, time resources occupied by a data signal in the N time resource groups; and sending, by the first user equipment, the data signal by using the time resources occupied by the data signal in the N time resource groups. In the embodiments of the present invention, energy consumption of a receive end can be reduced.

20 Claims, 4 Drawing Sheets

(56) References Cited

OTHER PUBLICATIONS

Qualcomm Incorporated, "Offline discussion summary on RPT", 3GPP TSG RAN WG1 #77, Seoul, Korea, May 19-23, 2014, R1-142657 (Year: 2014).*

Intel Corporation, "Distributed Resource Allocation for D2D Communication", 3GPP TSG RAN WG1, Seoul, Korea, May 19-23, 2014, R1-142016 (Year: 2014).*

*Scheduling assignment content for D2D*, 3GPP TSG RAN WG1 Meeting#77, R1-142592, Seoul, Korea, May 19-23, 2014, XP50788185A (4 pp.).

Communication pursuant to Article 94(3) EPC, dated May 8, 2018, in European Application No. 14898995.7 (6 pp.).

International Search Report dated Apr. 28, 2015 in corresponding International Patent Application No. PCT/CN2014/083548.

Extended European Search Report dated Jun. 22, 2017 in corresponding European Patent Application No. 14898995.7.

Sony: "D2D Resource Pool and Scheduling Assignments", 3GPP Draft; R1-141571 D2D Resource Pool, $3^{rd}$ Generation Partnership Project (3GPP), Mobile Competence Centre; 650, Route Des Lucioles; F-06921 Sophia-Antipolis Cedex; France, vol. RAN WG1, no. Shenzhen, China; Mar. 30, 2014, XP050787238.

LG Electronics: "Operational procedure in Mode 1 for D2D Communication", 3GPP Draft; R1-142150 Mode 1 for Communication_LG, $3^{rd}$ Generation Partnership Project (3GPP), Mobile Competence Centre; 650, Route Des Lucioles; F-06921 Sophia-Antipolis Cedex; France, vol. RAN WG1, no. Seoul, Korea; May 18, 2014, XP050787747.

International Search Report, dated Apr. 28, 2015, in International Application No. PCT/CN2014/083548 (4 pp.).

* cited by examiner

100

| S110: First user equipment obtains time resource grouping information, where the time resource grouping information includes time resource numbers in N time resource groups |

| S120: The first user equipment sends an indication signal, where the indication signal indicates one or more time resource numbers |

| S130: The first user equipment determines, according to the time resource grouping information and the one or more time resource numbers indicated by the indication signal, time resources occupied by a data signal in the N time resource groups |

| S140: The first user equipment sends the data signal by using the time resources occupied by the data signal in the N time resource groups |

FIG. 1

DATA TRANSMISSION METHOD AND USER EQUIPMENT

CROSS-REFERENCE TO RELATED APPLICATIONS

This application is a National Stage of International Application No. PCT/CN2014/083548, filed on Aug. 1, 2014, which is incorporated herein by reference in its entirety.

TECHNICAL FIELD

The present disclosure relates to the communications field, and more specifically, to a data transmission method and user equipment.

BACKGROUND

A device to device proximity service (Device to Device Proximity Service, D2D ProSe for short) between user equipments (User Equipment, UE for short) has become a hot topic for a Long Term Evolution (English: Long Term Evolution, LTE for short) system.

The D2D ProSe relates to a data signal and an indication signal. The indication signal is used to indicate a frequency resource occupied by the data signal, and the data signal is used to carry data. However, in an existing LTE communications system, the indication signal can indicate only the frequency resource occupied by the data signal. Therefore, a receive end needs to perform blind detection on all possible time resources, to obtain the data signal.

Currently, the indication signal cannot accurately indicate a time resource occupied by the data signal, and therefore the receive end needs to consume more time and electrical energy, to obtain the data signal.

SUMMARY

Embodiments of the present invention provide a data transmission method and user equipment, so as to can reduce energy consumption of a receive end.

According to a first aspect, a data transmission method is provided, and includes: obtaining, by first user equipment, time resource grouping information, where the time resource grouping information includes time resource numbers in N time resource groups, and N is a positive integer; sending, by the first user equipment, an indication signal, for example, a scheduling assignment signal (English: Scheduling Assignment, SA for short), where the indication signal indicates one or more time resource numbers; determining, by the first user equipment according to the time resource grouping information and the one or more time resource numbers indicated by the indication signal, time resources (that is, time resource numbers) occupied by a data signal in the N time resource groups, where for example, the data signal occupies only one time resource number in each time resource group; and sending, by the first user equipment, the data signal by using the time resources occupied by the data signal in the N time resource groups.

With reference to the first aspect, in a first possible implementation manner of the first aspect, the determining, by the first user equipment according to the time resource grouping information and the one or more time resource numbers indicated by the indication signal, time resources occupied by the data signal in the N time resource groups includes: determining, by the first user equipment according to a formula $\tilde{n}(n_{group}) = \mod(\tilde{n}_{RPT} + f(n_{group}), N_{group})$, a time resource number $\tilde{n}(n_{group})$ occupied by the data signal in a time resource group $n_{group}$, where $\mod( )$ is a mod function, $n_{group}$ is a time resource group sequence number, a value of $n_{group}$ is zero or a positive integer, $\tilde{n}_{RPT}$ is any time resource number in the one or more time resource numbers indicated by the indication signal, a value of $\tilde{n}_{RPT}$ is zero or a positive integer, $N_{group}$ is a quantity of time resources in the time resource group $n_{group}$, a value of $N_{group}$ is a positive integer, and $f(n_{group})$ is a time resource adjustment value in the time resource group $n_{group}$.

With reference to the first possible implementation manner of the first aspect, in a second possible implementation manner, when $N_{group} = 1$, $f(n_{group}) = 0$, and when $N_{group} \geq 2$, $$f(n_{group}) = \mod\left(\sum_{k=n_{group} \cdot M}^{n_{group} \cdot M + M - 1} c(k) \times 2^{k - (n_{group} \cdot M)}, N_{group}\right), \text{ or}$$

$$f(n_{group}) = \sum_{k=n_{group} \cdot M}^{n_{group} \cdot M + M - 1} c(k) \times 2^{k - (n_{group} \cdot M)},$$

where M is a positive integer not less than $\log_2 N_{group}$, and $c(k)$ is a pseudo-random sequence.

With reference to the first possible implementation manner of the first aspect, in a third possible implementation manner, when $N_{group} = 1$, $f(n_{group}) = 0$, and when $N_{group} \geq 2$, $$f(n_{group}) = \mod\left(f(n_{group} - 1) + \sum_{k=n_{group} \cdot M}^{n_{group} \cdot M + M - 1} c(k) \times 2^{k - (n_{group} \cdot M)}, N_{group}\right),$$

or $$f(n_{group}) = f(n_{group} - 1) + \sum_{k=n_{group} \cdot M}^{n_{group} \cdot M + M - 1} c(k) \times 2^{k - (n_{group} \cdot M)},$$

where M is a positive integer not less than $\log_2 N_{group}$, $c(k)$ is a pseudo-random sequence, and $f(-1) = 0$.

With reference to the third possible implementation manner of the first aspect, in a fourth possible implementation manner, when $N_{group} > 2$, $$f(n_{group}) = \mod\left(f(n_{group} - 1) + \mod\left(\sum_{k=n_{group} \cdot M}^{n_{group} \cdot M + M - 1} c(k) \times 2^{k - (n_{group} \cdot M)}, N_{group} - L\right) + L, N_{group}\right), \text{ or}$$

$$f(n_{group}) = f(n_{group} - 1) + \mod\left(\sum_{k=n_{group} \cdot M}^{n_{group} \cdot M + M - 1} c(k) \times 2^{k - (n_{group} \cdot M)}, N_{group} - L\right) + L,$$

where L is a positive integer, and is $1 \leq L < N_{group}$.

With reference to the first aspect, in a fifth possible implementation manner, the multiple time resource numbers indicated by the indication signal are time resource numbers of the time resources occupied by the data signal in the N time resource groups, and the method further includes: obtaining, by the first user equipment, time resource pool information, where the time resource pool information includes a time resource pool sequence number, and time resources in a time resource pool corresponding to the time resource pool sequence number are equal to a sum of time resources in the N time resource groups, and determining, according to a formula $ñ(n_{pool})=\text{mod}(ñ_{RPT}+f(n_{pool}), N_{pool})$, a time resource number $ñ(n_{pool})$ that is in each time resource group and occupied by the data signal in a time resource pool $n_{pool}$, where mod( ) is a mod function, $n_{pool}$ is a time resource pool sequence number, a value of $n_{pool}$ is zero or a positive integer, $ñ_{RPT}$ is any time resource number in the multiple time resource numbers indicated by the indication signal, a value of $ñ_{RPT}$ is zero or a positive integer, $N_{pool}$ is a quantity of all possible time resource numbers that are in the time resource groups and occupied by the data signal in the time resource pool $n_{pool}$, a value of $N_{pool}$ is a positive integer, and $f(n_{pool})$ is a time resource adjustment value in the time resource pool $n_{pool}$.

With reference to the fifth possible implementation manner of the first aspect, in a sixth possible implementation manner, when $N_{pool}=1$, $f(n_{pool})=0$, and when $N_{pool}≥2$, $$f(n_{pool}) = \text{mod}\left(\sum_{k=n_{pool} \cdot M}^{n_{pool} \cdot M+M-1} c(k) \times 2^{k-(n_{pool} \cdot M)}, N_{pool}\right), \text{ or}$$

$$f(n_{pool}) = \sum_{k=n_{pool} \cdot M}^{n_{pool} \cdot M+M-1} c(k) \times 2^{k-(n_{pool} \cdot M)},$$

where M is a positive integer not less than $\log_2^{N_{pool}}$, and c(k) is a pseudo-random sequence.

With reference to the fifth possible implementation manner of the first aspect, in a seventh possible implementation manner, when $N_{pool}=1$, $f(n_{pool})=0$, and when $N_{pool}≥2$, $$f(n_{pool}) = \text{mod}\left(f(n_{pool}-1) + \sum_{k=n_{pool} \cdot M}^{n_{pool} \cdot M+M-1} c(k) \times 2^{k-(n_{pool} \cdot M)}, N_{pool}\right), \text{ or}$$

$$f(n_{pool}) = f(n_{pool}-1) + \sum_{k=n_{pool} \cdot M}^{n_{pool} \cdot M+M-1} c(k) \times 2^{k-(n_{pool} \cdot M)},$$

where M is a positive integer not less than $\log_2^{N_{pool}}$, c(k) is a pseudo-random sequence, and $f(-1)=0$.

With reference to the seventh possible implementation manner of the first aspect, in an eighth possible implementation manner, when $N_{pool}>2$, $$f(n_{pool}) = \text{mod}\Bigg(f(n_{pool}-1) +$$

$$\text{mod}\left(\sum_{k=n_{pool} \cdot M}^{n_{pool} \cdot M+M-1} c(k) \times 2^{k-(n_{pool} \cdot M)}, N_{pool}-L\right) + L, N_{pool}\Bigg), \text{ or}$$

$$f(n_{pool}) = f(n_{pool}-1) + \text{mod}\left(\sum_{k=n_{pool} \cdot M}^{n_{pool} \cdot M+M-1} c(k) \times 2^{k-(n_{pool} \cdot M)}, N_{pool}-L\right) + L,$$

where L is a positive integer, and is $1≤L<N_{pool}$.

With reference to the first aspect, in a ninth possible implementation manner, time resource numbers of the time resources occupied by the data signal in the N time resource groups are the same.

With reference to any one of the second to eighth possible implementation manners of the first aspect, in a tenth possible implementation manner, an initialization sequence of the pseudo-random sequence c(k) is $c_{init}=N_{ID}^{cell}$, or $c_{init}=510$, or $c_{init}=2^9 \cdot \text{mod}(n_f, 4)+N_{ID}^{cell}$, or $c_{init}=2^9 \cdot \text{mod}(n_f, 4)+510$, where $N_{ID}^{cell}$ is a physical cell identifier, and $n_f$ is a system frame number.

With reference to any one of the first aspect or the first to ninth possible implementation manners of the first aspect, in an eleventh possible implementation manner, that the indication signal indicates the one or more time resource numbers includes: the indication signal includes a resource pattern of transmission field, and the resource pattern of transmission field is used to indicate the one or more time resource numbers.

With reference to any one of the first aspect or the first to ninth possible implementation manners of the first aspect, in a twelfth implementation manner of the first aspect, the obtaining, by first user equipment, time resource grouping information includes: obtaining, by the first user equipment, the time resource grouping information according to a correspondence between a time resource number and a time resource, where the correspondence between a time resource number and a time resource is preset, or is fed back by a receive end, or is provided by a third party, for example, a base station.

With reference to any one of the first aspect or the first to ninth possible implementation manners of the first aspect, in a thirteenth implementation manner of the first aspect, the time resource grouping information includes:

the time resources, for example, 20 subframes, are grouped into N groups, for example, five groups, each time resource group includes k time resources, where k is a positive integer, and time resource numbers in each time resource group are 0, 1, . . . , k−1.

According to a second aspect, a data transmission method is provided, and includes: obtaining, by second user equipment, time resource grouping information, where the time resource grouping information includes time resource numbers in N time resource groups, and N is a positive integer; receiving, by the second user equipment, an indication signal, for example, a scheduling assignment signal (English: Scheduling Assignment, SA for short), where the indication signal indicates one or more time resource numbers; determining, by the second user equipment according to the time resource grouping information and the one or more time resource numbers indicated by the indication signal, time resources occupied by a data signal in the N time resource groups, where for example, the data signal occupies only one time resource in each time resource group; and obtaining, by the second user equipment, the data signal according to the time resources occupied by the data signal in the N time resource groups.

With reference to the second aspect, in a first possible implementation manner of the second aspect, the determining, by the second user equipment according to the time resource grouping information and the one or more time resource numbers indicated by the indication signal, time resources occupied by the data signal in the N time resource groups includes: determining, by the second user equipment according to a formula $ñ(n_{group})=\text{mod}(ñ_{RPT}+f(n_{group}), N_{group})$, a time resource number $ñ(n_{group})$ occupied by the data signal in a time resource group $n_{group}$, where mod( ) is a mod function, $n_{group}$ is a time resource group sequence number, a value of $n_{group}$ is zero or a positive integer, $ñ_{RPT}$ is any time resource number in the one or more time resource numbers indicated by the indication signal, a value of $ñ_{RPT}$ is zero or a positive integer, $N_{group}$ is a quantity of time resources in the time resource group $n_{group}$, a value of $N_{group}$ is a positive integer, and $f(n_{group})$ is a time resource adjustment value in the time resource group $n_{group}$.

With reference to the first possible implementation manner of the second aspect, in a second possible implementation manner, when $N_{group}=1$, $f(n_{group})=0$, and when $N_{group}≥2$, $$f(n_{group}) = \mod\left(\sum_{k=n_{group} \cdot M}^{n_{group} \cdot M + M - 1} c(k) \times 2^{k-(n_{group} \cdot M)}, N_{group}\right), \text{ or}$$

$$f(n_{group}) = \sum_{k=n_{group} \cdot M}^{n_{group} \cdot M + M - 1} c(k) \times 2^{k-(n_{group} \cdot M)},$$

where M is a positive integer not less than $\log_2^{N_{group}}$, and $c(k)$ is a pseudo-random sequence.

With reference to the first possible implementation manner of the second aspect, in a third possible implementation manner, when $N_{group}=1$, $f(n_{group})=0$, and when $N_{group}≥2$, $$f(n_{group}) = \mod\left(f(n_{group} - 1) + \sum_{k=n_{group} \cdot M}^{n_{group} \cdot M + M - 1} c(k) \times 2^{k-(n_{group} \cdot M)}, N_{group}\right),$$

or $$f(n_{group}) = f(n_{group} - 1) + \sum_{k=n_{group} \cdot M}^{n_{group} \cdot M + M - 1} c(k) \times 2^{k-(n_{group} \cdot M)},$$

where M is a positive integer not less than $\log_2^{N_{group}}$, $c(k)$ is a pseudo-random sequence, and $f(-1)=0$.

With reference to the third possible implementation manner of the second aspect, in a fourth possible implementation manner, when $N_{group}>2$, $$f(n_{group}) = \mod\left(f(n_{group} - 1) + \mod\left(\sum_{k=n_{group} \cdot M}^{n_{group} \cdot M + M - 1} c(k) \times 2^{k-(n_{group} \cdot M)}, N_{group} - L\right) + L, N_{group}\right), \text{ or}$$

$$f(n_{group}) = f(n_{group} - 1) + \mod\left(\sum_{k=n_{group} \cdot M}^{n_{group} \cdot M + M - 1} c(k) \times 2^{k-(n_{group} \cdot M)}, N_{group} - L\right) + L,$$

where L is a positive integer, and is $1 \leq L < N_{group}$.

With reference to the second aspect, in a fifth possible implementation manner, the multiple time resource numbers indicated by the indication signal are time resource numbers of the time resources occupied by the data signal in the N time resource groups, and the method further includes: obtaining, by the second user equipment, time resource pool information, where the time resource pool information includes a time resource pool sequence number, and time resources in a time resource pool corresponding to the time resource pool sequence number are equal to a sum of time resources in the N time resource groups, and determining, according to a formula $ñ(n_{pool})=\mod(ñ_{RPT}, f(n_{pool}), N_{pool})$, a time resource number $ñ(n_{pool})$ that is in each time resource group and occupied by the data signal in a time resource pool $n_{pool}$, where mod( ) is a mod function, $n_{pool}$ is a time resource pool sequence number, a value of $n_{pool}$ is zero or a positive integer, $ñ_{RPT}$ is any time resource number in the multiple time resource numbers indicated by the indication signal, a value of $ñ_{RPT}$ is zero or a positive integer, $N_{pool}$ is a quantity of all possible time resource numbers that are in the time resource groups and occupied by the data signal in the time resource pool $n_{pool}$, a value of $N_{pool}$ is a positive integer, and $f(n_{pool})$ is a time resource adjustment value in the time resource pool $n_{pool}$.

With reference to the fifth possible implementation manner of the second aspect, in a sixth possible implementation manner, when $N_{pool}=1$, $f(n_{pool})=0$, and when $N_{pool}≥2$, $$f(n_{pool}) = \mod\left(\sum_{k=n_{pool} \cdot M}^{n_{pool} \cdot M + M - 1} c(k) \times 2^{k-(n_{pool} \cdot M)}, N_{pool}\right), \text{ or}$$

$$f(n_{pool}) = \sum_{k=n_{pool} \cdot M}^{n_{pool} \cdot M + M - 1} c(k) \times 2^{k-(n_{pool} \cdot M)},$$

where M is a positive integer not less than $\log_2^{N_{pool}}$, and $c(k)$ is a pseudo-random sequence.

With reference to the fifth possible implementation manner of the second aspect, in a seventh possible implementation manner, when $N_{pool}=1$, $f(n_{pool})=0$, and when $N_{pool}≥2$, $$f(n_{pool}) = \mod\left(f(n_{pool} - 1) + \sum_{k=n_{pool} \cdot M}^{n_{pool} \cdot M + M - 1} c(k) \times 2^{k-(n_{pool} \cdot M)}, N_{pool}\right),$$

or $$f(n_{pool}) = f(n_{pool} - 1) + \sum_{k=n_{pool} \cdot M}^{n_{pool} \cdot M + M - 1} c(k) \times 2^{k-(n_{pool} \cdot M)},$$

where M is a positive integer not less than $\log_2^{N_{pool}}$, $c(k)$ is a pseudo-random sequence, and $f(-1)=0$.

With reference to the seventh possible implementation manner of the second aspect, in an eighth possible implementation manner, when $N_{pool}>2$, $$f(n_{pool}) = \mod\left(f(n_{pool} - 1) + \mod\left(\sum_{k=n_{pool} \cdot M}^{n_{pool} \cdot M + M - 1} c(k) \times 2^{k-(n_{pool} \cdot M)}, N_{pool} - L\right) + L, N_{pool}\right), \text{ or}$$

$$f(n_{pool}) = f(n_{pool} - 1) + \mod\left(\sum_{k=n_{pool} \cdot M}^{n_{pool} \cdot M + M - 1} c(k) \times 2^{k-(n_{pool} \cdot M)}, N_{pool} - L\right) + L,$$

where L is a positive integer, and is $1 \leq L < N_{pool}$.

With reference to the second aspect, in a ninth possible implementation manner, time resource numbers of the time resources occupied by the data signal in the N time resource groups are the same.

With reference to any one of the second to eighth possible implementation manners of the second aspect, in a tenth possible implementation manner, an initialization sequence of the pseudo-random sequence c(k) is $c_{init}=N_{ID}^{cell}$, or $c_{init}=510$, or $c_{init}=2^9 \cdot \text{mod}(n_f, 4)+N_{ID}^{cell}$, or $c_{init}=2^9 \cdot \text{mod}(n_f, 4)+510$, where $N_{ID}^{cell}$ is a physical cell identifier, and $n_f$ is a system frame number.

With reference to any one of the second aspect or the first to ninth possible implementation manners of the second aspect, in an eleventh possible implementation manner, that the indication signal indicates the one or more time resource numbers includes: the indication signal includes a resource pattern of transmission field, and the resource pattern of transmission field is used to indicate the one or more time resource numbers.

With reference to any one of the second aspect or the first to ninth possible implementation manners of the second aspect, in a twelfth implementation manner of the second aspect, the obtaining, by second user equipment, time resource grouping information includes: obtaining, by the second user equipment, the time resource grouping information according to a correspondence between a time resource number and a time resource, where the correspondence between a time resource number and a time resource is preset, or is fed back by a transmit end, or is provided by a third party, for example, a base station.

With reference to any one of the second aspect or the first to ninth possible implementation manners of the second aspect, in a thirteenth implementation manner of the second aspect, the time resource grouping information includes:

the time resources, for example, 20 subframes, are grouped into N groups, for example, five groups, each time resource group includes k time resources, where k is a positive integer, and time resource numbers in each time resource group are 0, 1, . . . , k−1.

With reference to the second aspect, in a fourteenth possible implementation manner, the obtaining, by the second user equipment, the data signal on the time resources occupied by the data signal in the N time resource groups includes: determining, by the second user equipment according to a correspondence between a time resource number and a time resource that are occupied by the data signal in the N time resource groups, the time resources corresponding to the resource numbers, and obtaining the data signal on the time resources occupied by the data signal in the N time resource groups, where the correspondence between a time resource number and a time resource that are occupied by the data signal in the N time resource groups is preset, or is obtained from a transmit end, or is obtained from a third party, for example, a base station.

With reference to the second aspect, in a fifteenth possible implementation manner of the second aspect, the method further includes: receiving, by the second user equipment, a correspondence between a time resource number and a time resource.

According to a third aspect, user equipment is provided, and includes: an obtaining unit, configured to obtain time resource grouping information, where the time resource grouping information includes time resource numbers in N time resource groups, and N is a positive integer; a first sending unit, configured to send an indication signal, for example, a scheduling assignment signal (English: Scheduling Assignment, SA for short), where the indication signal indicates one or more time resource numbers; a determining unit, configured to determine, according to the time resource grouping information and the one or more time resource numbers indicated by the indication signal, time resources occupied by a data signal in the N time resource groups, where for example, the data signal occupies only one time resource in each time resource group; and a second sending unit, configured to send the data signal by using the time resources occupied by the data signal in the N time resource groups.

With reference to the third aspect, in a first possible implementation manner, the determining unit is specifically configured to determine, according to a formula $\tilde{n}(n_{group})=\text{mod}(\tilde{n}_{RPT}+f(n_{group}), N_{group})$, a time resource number $\tilde{n}(n_{group})$ occupied by the data signal in a time resource group $n_{group}$, where mod( ) is a mod function, $n_{group}$ is a time resource group sequence number, a value of $n_{group}$ is zero or a positive integer, $\tilde{n}_{RPT}$ is any time resource number in the one or more time resource numbers indicated by the indication signal, a value of $\tilde{n}_{RPT}$ is zero or a positive integer, $N_{group}$ is a quantity of time resources in the time resource group $n_{group}$, a value of $N_{group}$ is a positive integer, and $f(n_{group})$ is a time resource adjustment value in the time resource group $n_{group}$.

With reference to the first possible implementation manner of the third aspect, in a second possible implementation manner, when $N_{group}=1$, $f(n_{group})=0$, and when $N_{group} \geq 2$, $$f(n_{group}) = \text{mod}\left(\sum_{k=n_{group} \cdot M}^{n_{group} \cdot M + M - 1} c(k) \times 2^{k-(n_{group} \cdot M)}, N_{group}\right), \text{ or}$$

$$f(n_{group}) = \sum_{k=n_{group} \cdot M}^{n_{group} \cdot M + M - 1} c(k) \times 2^{k-(n_{group} \cdot M)},$$

where M is a positive integer not less than $\log_2^{N_{group}}$, and c(k) is a pseudo-random sequence.

With reference to the first possible implementation manner of the third aspect, in a third possible implementation manner, when $N_{group}=1$, $f(n_{group})=0$, and when $N_{group} \geq 2$, $$f(n_{group}) = \text{mod}\left(f(n_{group}-1) + \sum_{k=n_{group} \cdot M}^{n_{group} \cdot M + M - 1} c(k) \times 2^{k-(n_{group} \cdot M)}, N_{group}\right),$$

or $$f(n_{group}) = f(n_{group}-1) + \sum_{k=n_{group} \cdot M}^{n_{group} \cdot M + M - 1} c(k) \times 2^{k-(n_{group} \cdot M)},$$

where M is a positive integer not less than $\log_2^{N_{group}}$, c(k) is a pseudo-random sequence, and $f(-1)=0$.

With reference to the third possible implementation manner of the third aspect, in a fourth possible implementation manner, when $N_{group}>2$, $$f(n_{group}) = \text{mod}\Bigg(f(n_{group}-1) + \text{mod}\left(\sum_{k=n_{group} \cdot M}^{n_{group} \cdot M + M - 1} c(k) \times 2^{k-(n_{group} \cdot M)}, N_{group} - L\right) + L, N_{group}\Bigg), \text{ or}$$

-continued $$f(n_{group}) = f(n_{group} - 1) + \mod\left(\sum_{k=n_{group}\cdot M}^{n_{group}\cdot M+M-1} c(k) \times 2^{k-(n_{group}\cdot M)}, N_{group} - L\right) + L,$$

where L is a positive integer, and is $1 \leq L < N_{group}$.

With reference to the third aspect, in a fifth possible implementation manner, the multiple time resource numbers indicated by the indication signal are time resource numbers of the time resources occupied by the data signal in the N time resource groups; the obtaining unit is specifically configured to obtain time resource pool information, where the time resource pool information includes a time resource pool sequence number, and time resources in a time resource pool corresponding to the time resource pool sequence number are equal to a sum of time resources in the N time resource groups; and the determining unit is specifically configured to determine, according to a formula $ñ(n_{pool}) = \mod(ñ_{RPT} + f(n_{pool}), N_{pool})$, a time resource number $ñ(n_{pool})$ that is in each time resource group and occupied by the data signal in a time resource pool $n_{pool}$, where mod( ) is a mod function, $n_{pool}$ is a time resource pool sequence number, a value of $n_{pool}$ is zero or a positive integer, $ñ_{RPT}$ is any time resource number in the multiple time resource numbers indicated by the indication signal, a value of $ñ_{RPT}$ is zero or a positive integer, $N_{pool}$ is a quantity of all possible time resource numbers that are in the time resource groups and occupied by the data signal in the time resource pool $n_{pool}$, a value of $N_{pool}$ is a positive integer, and $f(n_{pool})$ is a time resource adjustment value in the time resource pool $n_{pool}$.

With reference to the fifth possible implementation manner of the third aspect, in a sixth possible implementation manner, when $N_{pool}=1$, $f(n_{pool})=0$, and when $N_{pool} \geq 2$, $$f(n_{pool}) = \mod\left(\sum_{k=n_{pool}\cdot M}^{n_{pool}\cdot M+M-1} c(k) \times 2^{k-(n_{pool}\cdot M)}, N_{pool}\right), \text{ or}$$

$$f(n_{pool}) = \sum_{k=n_{pool}\cdot M}^{n_{pool}\cdot M+M-1} c(k) \times 2^{k-(n_{pool}\cdot M)},$$

where M is a positive integer not less than $\log_2 N_{pool}$, and $c(k)$ is a pseudo-random sequence.

With reference to the fifth possible implementation manner of the third aspect, in a seventh possible implementation manner, when $N_{pool}=1$, $f(n_{pool})=0$, and when $N_{pool} \geq 2$, $$f(n_{pool}) = \mod\left(f(n_{pool} - 1) + \sum_{k=n_{pool}\cdot M}^{n_{pool}\cdot M+M-1} c(k) \times 2^{k-(n_{pool}\cdot M)}, N_{pool}\right), \text{ or}$$

$$f(n_{pool}) = f(n_{pool} - 1) + \sum_{k=n_{pool}\cdot M}^{n_{pool}\cdot M+M-1} c(k) \times 2^{k-(n_{pool}\cdot M)},$$

where M is a positive integer not less than $\log_2 N_{pool}$, $c(k)$ is a pseudo-random sequence, and $f(-1)=0$.

With reference to the seventh possible implementation manner of the third aspect, in an eighth possible implementation manner, when $N_{pool} \geq 2$, $$f(n_{pool}) = \mod\left(f(n_{pool} - 1) + \mod\left(\sum_{k=n_{pool}\cdot M}^{n_{pool}\cdot M+M-1} c(k) \times 2^{k-(n_{pool}\cdot M)}, N_{pool} - L\right) + L, N_{pool}\right), \text{ or}$$

$$f(n_{pool}) = f(n_{pool} - 1) + \mod\left(\sum_{k=n_{pool}\cdot M}^{n_{pool}\cdot M+M-1} c(k) \times 2^{k-(n_{pool}\cdot M)}, N_{pool} - L\right) + L,$$

where L is a positive integer, and is $1 \leq L < N_{pool}$.

With reference to the third aspect, in a ninth possible implementation manner, time resource numbers of the time resources occupied by the data signal in the N time resource groups are the same.

With reference to any one of the second to eighth possible implementation manners of the third aspect, in a tenth possible implementation manner, an initialization sequence of the pseudo-random sequence $c(k)$ is $c_{init}=N_{ID}^{cell}$, or $c_{init}=510$, or $c_{init}=2^9 \cdot \mod(n_f, 4) + N_{ID}^{cell}$, or $c_{init}=2^9 \cdot \mod(n_f, 4)+510$, where $N_{ID}^{cell}$ is a physical cell identifier, and $n_f$ is a system frame number.

With reference to any one of the third aspect or the first to ninth possible implementation manners of the third aspect, in an eleventh possible implementation manner, that the indication signal indicates the one or more time resource numbers includes: the indication signal includes a resource pattern of transmission field, and the resource pattern of transmission field is used to indicate the one or more time resource numbers.

With reference to any one of the third aspect or the first to ninth possible implementation manners of the third aspect, in a twelfth implementation manner of the third aspect, the obtaining unit is specifically configured to obtain the time resource grouping information according to a correspondence between a time resource number and a time resource, where the correspondence between a time resource number and a time resource is preset, or is fed back by a receive end, or is provided by a third party, for example, a base station.

With reference to any one of the third aspect or the first to ninth possible implementation manners of the third aspect, in a thirteenth implementation manner of the third aspect, the time resource grouping information includes: the time resources, for example, 20 subframes, are grouped into N groups, for example, five groups, each time resource group includes k time resources, where k is a positive integer, and time resource numbers in each time resource group are 0, 1, . . . , k−1.

According to a fourth aspect, user equipment is provided, and includes: a first obtaining unit, configured to obtain time resource grouping information, where the time resource grouping information includes time resource numbers in N time resource groups, and N is a positive integer; a receiving unit, configured to receive an indication signal, for example, a scheduling assignment signal (English: Scheduling Assignment, SA for short), where the indication signal indicates one or more time resource numbers; a determining unit, configured to determine, according to the time resource grouping information and the one or more time resource numbers indicated by the indication signal, time resources occupied by a data signal in the N time resource groups, where for example, the data signal occupies only one time resource in each time resource group; and a second obtaining unit, configured to obtain the data signal according to the time resources occupied by the data signal in the N time resource groups.

With reference to the fourth aspect, in a first possible implementation manner, the determining unit is specifically configured to determine, according to a formula $\tilde{n}(n_{group})=\mod(\tilde{n}_{RPT}+f(n_{group}), N_{group})$, a time resource number $\tilde{n}(n_{group})$ occupied by the data signal in a time resource group $n_{group}$, where mod( ) is a mod function, $n_{group}$ is a time resource group sequence number, a value of $n_{group}$ is zero or a positive integer, $\tilde{n}_{RPT}$ is any time resource number in the one or more time resource numbers indicated by the indication signal, a value of $\tilde{n}_{RPT}$ is zero or a positive integer, $N_{group}$ is a quantity of time resources in the time resource group $n_{group}$, a value of $N_{group}$ is a positive integer, and $f(n_{group})$ is a time resource adjustment value in the time resource group $n_{group}$.

With reference to the first possible implementation manner of the fourth aspect, in a second possible implementation manner, when $N_{group}=1$, $f(n_{group})=0$, and when $N_{group}\geq 2$, $$f(n_{group}) = \mod\left(\sum_{k=n_{group}\cdot M}^{n_{group}\cdot M+M-1} c(k)\times 2^{k-(n_{group}\cdot M)}, N_{group}\right), \text{ or}$$

$$f(n_{group}) = \sum_{k=n_{group}\cdot M}^{n_{group}\cdot M+M-1} c(k)\times 2^{k-(n_{group}\cdot M)},$$

where M is a positive integer not less than $\log_2^{N_{group}}$, and c(k) is a pseudo-random sequence.

With reference to the first possible implementation manner of the fourth aspect, in a third possible implementation manner, when $N_{group}=1$, $f(n_{group})=0$, and when $N_{group}\geq 2$, $$f(n_{group}) = \mod\left(f(n_{group}-1)+\sum_{k=n_{group}\cdot M}^{n_{group}\cdot M+M-1} c(k)\times 2^{k-(n_{group}\cdot M)}, N_{group}\right),$$

or $$f(n_{group}) = f(n_{group}-1)+\sum_{k=n_{group}\cdot M}^{n_{group}\cdot M+M-1} c(k)\times 2^{k-(n_{group}\cdot M)},$$

where M is a positive integer not less than $\log_2^{N_{group}}$, c(k) is a pseudo-random sequence, and $f(-1)=0$.

With reference to the third possible implementation manner of the fourth aspect, in a fourth possible implementation manner, when $N_{group}>2$, $$f(n_{group}) = \mod\left(f(n_{group}-1)+\right.$$
$$\left.\mod\left(\sum_{k=n_{group}\cdot M}^{n_{group}\cdot M+M-1} c(k)\times 2^{k-(n_{group}\cdot M)}, N_{group}-L\right)+L, N_{group}\right), \text{ or}$$

$$f(n_{group}) = f(n_{group}-1)+\mod$$
$$\left(\sum_{k=n_{group}\cdot M}^{n_{group}\cdot M+M-1} c(k)\times 2^{k-(n_{group}\cdot M)}, N_{group}-L\right)+L,$$

where L is a positive integer, and is $1\leq L<N_{group}$.

With reference to the fourth aspect, in a fifth possible implementation manner, the multiple time resource numbers indicated by the indication signal are time resource numbers of the time resources occupied by the data signal in the N time resource groups; the first obtaining unit is specifically configured to obtain time resource pool information, where the time resource pool information includes a time resource pool sequence number, and time resources in a time resource pool corresponding to the time resource pool sequence number are equal to a sum of time resources in the N time resource groups; and the determining unit is specifically configured to determine, according to a formula $\tilde{n}(n_{pool})=\mod(\tilde{n}_{RPT}+f(n_{pool}), N_{pool})$, a time resource number $\tilde{n}(n_{pool})$ that is in each time resource group and occupied by the data signal in a time resource pool $n_{pool}$, where mod( ) is a mod function, $n_{pool}$ is a time resource pool sequence number, a value of $n_{pool}$ is zero or a positive integer, $\tilde{n}_{RPT}$ is any time resource number in the multiple time resource numbers indicated by the indication signal, a value of $\tilde{n}_{RPT}$ is zero or a positive integer, $N_{pool}$ is a quantity of all possible time resource numbers that are in the time resource groups and occupied by the data signal in the time resource pool $n_{pool}$, a value of $N_{pool}$ is a positive integer, and $f(n_{pool})$ is a time resource adjustment value in the time resource pool $n_{pool}$.

With reference to the fifth possible implementation manner of the fourth aspect, in a sixth possible implementation manner, when $N_{pool}=1$, $f(n_{pool})=0$, and when $N_{pool}\geq 2$, $$f(n_{pool}) = \mod\left(\sum_{k=n_{pool}\cdot M}^{n_{pool}\cdot M+M-1} c(k)\times 2^{k-(n_{pool}\cdot M)}, N_{pool}\right), \text{ or}$$

$$f(n_{pool}) = \sum_{k=n_{pool}\cdot M}^{n_{pool}\cdot M+M-1} c(k)\times 2^{k-(n_{pool}\cdot M)},$$

where M is a positive integer not less than $\log_2^{N_{pool}}$, and c(k) is a pseudo-random sequence.

With reference to the fifth possible implementation manner of the fourth aspect, in a seventh possible implementation manner, when $N_{pool}=1$, $f(n_{pool})=0$, and when $N_{pool}\geq 2$, $$f(n_{pool}) = \mod\left(f(n_{pool}-1)+\sum_{k=n_{pool}\cdot M}^{n_{pool}\cdot M+M-1} c(k)\times 2^{k-(n_{pool}\cdot M)}, N_{pool}\right), \text{ or}$$

$$f(n_{pool}) = f(n_{pool}-1)+\sum_{k=n_{pool}\cdot M}^{n_{pool}\cdot M+M-1} c(k)\times 2^{k-(n_{pool}\cdot M)},$$

where M is a positive integer not less than $\log_2^{N_{pool}}$, c(k) is a pseudo-random sequence, and $f(-1)=0$.

With reference to the seventh possible implementation manner of the fourth aspect, in an eighth possible implementation manner, when $N_{pool}>2$, $$f(n_{pool}) = \mod\left(f(n_{pool}-1)+\right.$$
$$\left.\mod\left(\sum_{k=n_{pool}\cdot M}^{n_{pool}\cdot M+M-1} c(k)\times 2^{k-(n_{pool}\cdot M)}, N_{pool}-L\right)+L, N_{pool}\right), \text{ or}$$

-continued $$f(n_{pool}) = f(n_{pool} - 1) + \mod\left(\sum_{k=n_{pool} \cdot M}^{n_{pool} \cdot M + M - 1} c(k) \times 2^{k-(n_{pool} \cdot M)}, N_{pool} - L\right) + L,$$

where L is a positive integer, and is $1 \leq L < N_{pool}$.

With reference to the fourth aspect, in a ninth possible implementation manner, time resource numbers of the time resources occupied by the data signal in the N time resource groups are the same.

With reference to any one of the second to eighth possible implementation manners of the fourth aspect, in a tenth possible implementation manner, an initialization sequence of the pseudo-random sequence c(k) is $c_{init} = N_{ID}^{cell}$, or $c_{init} = 510$, or $c_{init} = 2^9 \cdot \mod(n_f, 4) + N_{ID}^{cell}$, or $c_{init} = 2^9 \cdot \mod(n_f, 4) + 510$, where $N_{ID}^{cell}$ is a physical cell identifier, and $n_f$ is a system frame number.

With reference to any one of the fourth aspect or the first to ninth possible implementation manners of the fourth aspect, in an eleventh possible implementation manner, that the indication signal indicates the one or more time resource numbers includes: the indication signal includes a resource pattern of transmission field, and the resource pattern of transmission field is used to indicate the one or more time resource numbers.

With reference to any one of the fourth aspect or the first to ninth possible implementation manners of the fourth aspect, in a twelfth implementation manner of the fourth aspect, the second obtaining unit is specifically configured to obtain the time resource grouping information according to a correspondence between a time resource number and a time resource, where the correspondence between a time resource number and a time resource is preset, or is fed back by a transmit end, or is provided by a third party, for example, a base station.

With reference to any one of the fourth aspect or the first to ninth possible implementation manners of the fourth aspect, in a thirteenth implementation manner of the fourth aspect, the time resource grouping information includes: the time resources, for example, 20 subframes, are grouped into N groups, for example, five groups, each time resource group includes k time resources, where k is a positive integer, and time resource numbers in each time resource group are 0, 1, . . . , k−1.

With reference to the fourth aspect, in a fourteenth possible implementation manner, the second obtaining unit is specifically configured to: determine, according to a correspondence between a time resource number and a time resource that are occupied by the data signal in the N time resource groups, the time resources corresponding to the resource numbers, and obtain the data signal on the time resources occupied by the data signal in the N time resource groups, where the correspondence between a time resource number and a time resource that are occupied by the data signal in the N time resource groups is preset, or is obtained from a transmit end, or is obtained from a third party, for example, a base station.

With reference to the fourth aspect, in a fifteenth possible implementation manner of the fourth aspect, the receiving unit is specifically configured to receive a correspondence between a time resource number and a time resource.

Based on the foregoing technical solutions, in the embodiments of the present invention, first user equipment may obtain time resource grouping information, where the time resource grouping information includes time resource numbers in N time resource groups, and N is a positive integer; the first user equipment sends an indication signal, where the indication signal indicates one or more time resource numbers; the first user equipment determines, according to the time resource grouping information and the one or more time resource numbers indicated by the indication signal, time resources occupied by a data signal in the N time resource groups; and the first user equipment sends the data signal by using the time resources occupied by the data signal in the N time resource groups. In this way, a time resource bearing the data signal can be accurately indicated, which reduces a processing time and electrical energy consumption of a receive end, and improves network performance.

BRIEF DESCRIPTION OF DRAWINGS

To describe the technical solutions in the embodiments of the present invention more clearly, the following briefly describes the accompanying drawings required for describing the embodiments of the present invention. Apparently, the accompanying drawings in the following description show merely some embodiments of the present invention, and a person of ordinary skill in the art may still derive other drawings from these accompanying drawings without creative efforts.

FIG. 1 is a schematic flowchart of a data transmission method according to an embodiment of the present invention;

DESCRIPTION OF EMBODIMENTS

Figure 2:
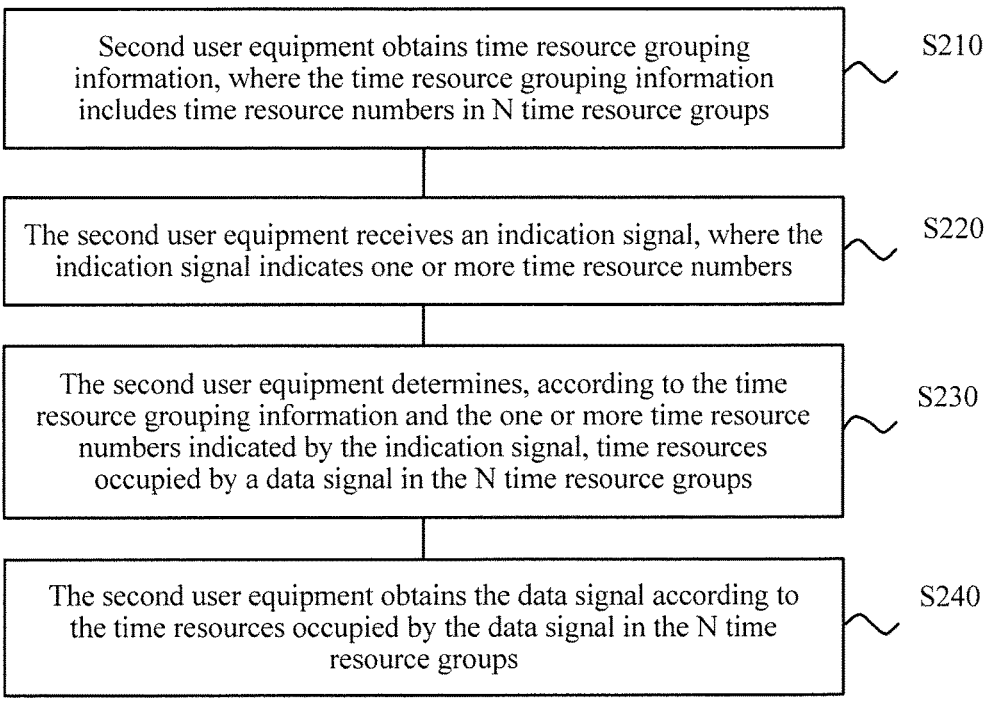
FIG. 2 is a schematic flowchart of a data transmission method according to another embodiment of the present invention.

The following clearly describes the technical solutions in the embodiments of the present invention with reference to the accompanying drawings in the embodiments of the present invention. Apparently, the described embodiments are some rather than all of the embodiments of the present invention. All other embodiments obtained by a person of ordinary skill in the art based on the embodiments of the present invention without creative efforts shall fall within the protection scope of the present invention.

It should be understood that, the technical solutions in the embodiments of the present invention may be applied to various communications systems, such as a Global System for Mobile Communications (Global System of Mobile communication, GSM) system, a Code Division Multiple Access (Code Division Multiple Access, CDMA) system, a Wideband Code Division Multiple Access (Wideband Code Division Multiple Access, WCDMA) system, a general packet radio service (General Packet Radio Service, GPRS), a Long Term Evolution (Long Term Evolution, LTE) system, an LTE frequency division duplex (Frequency Division Duplex, FDD) system, LTE time division duplex (Time Division Duplex, TDD), Universal Mobile Telecommunications System (Universal Mobile Telecommunication System, UMTS), and a Worldwide Interoperability for Microwave Access (Worldwide Interoperability for Microwave Access, WiMAX) communications system.

period of 20 ms. That is, the VoIP data packet needs to be sent by occupying multiple subframes in 20 subframes.

TABLE 1

| | Time resources (for example, 20 subframes) | | | | | | | | | | | | | | | | | | | |
|---|---|---|---|---|---|---|---|---|---|---|---|---|---|---|---|---|---|---|---|---|
| Time resource group sequence number | 0 | | | | 1 | | | | 2 | | | | 3 | | | | 4 | | | |
| Time resource number | 0 | 1 | 2 | 3 | 0 | 1 | 2 | 3 | 0 | 1 | 2 | 3 | 0 | 1 | 2 | 3 | 0 | 1 | 2 | 3 |

It should be understood that, in the embodiments of the present invention, user equipment (English: User Equipment, UE for short) includes but is not limited to a mobile station (English: Mobile Station, MS for short), a mobile terminal (Mobile Terminal), a mobile telephone (Mobile Telephone), a handset (handset), and portable equipment (portable equipment). The user equipment may communicate with one or more core networks by using a radio access network (English: Radio Access Network, RAN for short). For example, the user equipment may be a mobile telephone (or referred to as a "cellular" phone), or a computer having a wireless communication function, or the user equipment may be a portable, pocket-sized, handheld, computer built-in, or in-vehicle mobile apparatus.

It should be understood that, user equipment in technical solutions in the present invention has a D2D communication function, that is, two user equipments may perform D2D communication with each other.

It should also be understood that, first user equipment and second user equipment in the embodiments of the present invention are merely for convenient description, and are not limited.

In the embodiments of the present invention, a base station may be a base transceiver station (English: Base Transceiver Station, BTS for short) in GSM or CDMA, or may be a NodeB (NodeB) in WCDMA, or may be an evolved NodeB (English: evolved Node B, eNB or e-NodeB for short) in LTE, or may be a cluster head (Cluster Head) of a user cluster in D2D communication. This is not limited in the embodiments of the present invention.

FIG. 1 shows a data transmission method 100. The method 100 may be executed by, for example, user equipment. As shown in FIG. 1, the method 100 includes the following steps.

S110. First user equipment obtains time resource grouping information, where the time resource grouping information includes time resource numbers in N time resource groups, and N is a positive integer.

It should be understood that, quantities of time resource numbers in the N time resource groups may be the same or different. The time resource grouping information may be sent by a third party, for example, a base station or a receive end, or may be preset in the user equipment. This is not limited in this embodiment of the present invention.

It should be noted that, the time resource may be a subframe or a timeslot or the like. In D2D communication, for example, in a VoIP (Voice over Internet Protocol) voice service, a data transmission model is transmitting information of 44 bytes (Bytes), 352 bits (bit) in total, including 328-bit valid payload (payload) information and 24-bit cyclic redundancy check (English: Cyclic Redundancy Check, CRC for short) information within 20 milliseconds (ms), that is, in 20 subframes. To ensure coverage of the VoIP voice service, a VoIP data packet needs to be transmitted multiple times, for example, five times, within a Referring to Table 1, in this step, the first user equipment may group time resources, for example, 20 subframes, used for transmitting a data signal into N groups, for example, five groups. Each time resource group includes four subframes, and time resource numbers in each time resource group are 0, 1, . . . , 3. That is, in the 20 subframes, the VoIP data packet is sent by using any subframe in each time resource group, that is, a total of five subframes. In this way, the coverage of the VoIP voice service is ensured.

S120. The first user equipment sends an indication signal, for example, a scheduling assignment signal (English: Scheduling Assignment, SA for short), where the indication signal indicates one or more time resource numbers.

Specifically, the first user equipment may send the indication signal according to scheduling information of a base station. This is not limited in this embodiment of the present invention. For example, the first user equipment may send the indication signal according to a feedback from a receive end, or may send the indication signal according to a pre-configuration.

S130. The first user equipment determines, according to the time resource grouping information and the one or more time resource numbers indicated by the indication signal, time resources (that is, time resource numbers) occupied by a data signal in the N time resource groups. For example, the data signal occupies only one time resource number in each time resource group.

It should be understood that, the first user equipment may determine, by using multiple methods, a time resource occupied by the data signal in each of the N time resource groups, that is, a time resource number occupied by the data signal in each time resource group. The data signal may occupy one or more time resource numbers in each time resource group. This is not limited in this embodiment of the present invention.

S140. The first user equipment sends the data signal by using the time resources (that is, time resources corresponding to the time resource numbers) occupied by the data signal in the N time resource groups.

It should be understood that, the first user equipment may send the data signal by using multiple methods, for example, simultaneously or sequentially send the time resources occupied by the data signal in the N time resource groups. This is not limited in this embodiment of the present invention.

It should be understood that, in the embodiments of the present invention, the sequence numbers of the foregoing processes do not imply an execution order. The execution order of the processes shall be determined by using functions and internal logic of the processes, and the sequence numbers shall not constitute any limitation on an implementation process of the embodiments of the present invention.

The foregoing describes the data transmission method according to the embodiment of the present invention from a perspective of the first user equipment with reference to FIG. 1.

The following provides a more detailed description of the embodiment of the present invention with reference to specific examples. It should be noted that, the example in FIG. 1 is merely intended to help a person skilled in the art understand the embodiment of the present invention, rather than to limit the embodiment of the present invention to the exemplary specific value or specific scenario. Apparently, a person skilled in the art can make various equivalent modifications or variations according to the example provided in FIG. 1, and such modifications or variations also fall within the scope of the embodiments of the present invention.

According to this embodiment of the present invention, that the indication signal indicates the one or more time resource numbers includes: the indication signal includes a resource pattern of transmission (English: Resource Pattern of Transmission, RPT for short) field, and the resource pattern of transmission field is used to indicate the one or more time resource numbers.

Specifically, referring to Table 1, for example, 2 bits 00 in the RPT field indicates a time resource number 0; 2 bits 01 in the RPT field indicates a time resource number 1; 2 bits 10 in the RPT field indicates a time resource number 2; and 2 bits 11 in the RPT field indicates a time resource number 3. Another time resource number may be represented by more bits in the RPT field. This is not limited in this embodiment of the present invention.

Optionally, time resource numbers of the time resources occupied by the data signal in the N time resource groups are the same.

Specifically, referring to Table 1, for example, when the RPT is 00, it indicates a time resource number 0. If time resources whose time resource numbers are 0 are used to send the data signal in all five time resource groups, such a fixed time resource interval is not helpful in randomizing inter-cell interference. For example, if two user equipments in two cells both use time resources corresponding to time resource numbers 0 to send data signals, the data signals of the two user equipments always collide with each other.

To overcome the problem that exists in the foregoing embodiment, another embodiment is provided. That the first user equipment determines, according to the time resource grouping information and the one or more time resource numbers indicated by the indication signal, time resources occupied by the data signal in the N time resource groups includes: determining, by the first user equipment according to a formula:

$$\tilde{n}(n_{group}) = \mathrm{mod}(\tilde{n}_{RPT} + f(n_{group}), N_{group}) \quad (1)$$

a time resource number $\tilde{n}(n_{group})$ occupied by the data signal in a time resource group $n_{group}$, where mod( ) is a mod function, $n_{group}$ is a time resource group sequence number, a value of $n_{group}$ is zero or a positive integer, $\tilde{n}_{RPT}$ is any time resource number in the one or more time resource numbers indicated by the indication signal, a value of $\tilde{n}_{RPT}$ is zero or a positive integer, $N_{group}$ is a quantity of time resources in the time resource group $n_{group}$, a value of $N_{group}$ is a positive integer, for example, $N_{group}$ shown in Table 1 is 4, and $f(n_{group})$ is a time resource adjustment value in the time resource group $n_{group}$.

It should be understood that, the time resource adjustment value $f(n_{group})$ may be a random number, or any value determined in another manner. This is not limited in this embodiment of the present invention.

Optionally, when $N_{group}=1$, $f(n_{group})=0$, and when $N_{group} \geq 2$, $$f(n_{group}) = \mathrm{mod}\left(\sum_{k=n_{group} \cdot M}^{n_{group} \cdot M + M - 1} c(k) \times 2^{k-(n_{group} \cdot M)}, N_{group}\right); \text{or} \quad (2a)$$

$$f(n_{group}) = \sum_{k=n_{group} \cdot M}^{n_{group} \cdot M + M - 1} c(k) \times 2^{k-(n_{group} \cdot M)}, \quad (2b)$$

where
M is a positive integer not less than $\log_2 N_{group}$, for example, M shown in Table 1 is 2, and c(k) is a pseudo-random sequence.

Optionally, when $N_{group}=1$, $f(n_{group})=0$, and when $N_{group} \geq 2$, $$f(n_{group}) = \mathrm{mod}\left(f(n_{group}-1) + \sum_{k=n_{group} \cdot M}^{n_{group} \cdot M + M - 1} c(k) \times 2^{k-(n_{group} \cdot M)}, N_{group}\right); \text{or} \quad (3a)$$

$$f(n_{group}) = f(n_{group}-1) + \sum_{k=n_{group} \cdot M}^{n_{group} \cdot M + M - 1} c(k) \times 2^{k-(n_{group} \cdot M)}, \quad (3b)$$

where
M is a positive integer not less than $\log_2 N_{group}$, for example, M shown in Table 1 is 2, c(k) is a pseudo-random sequence, and $f(-1)=0$.

Optionally, when $N_{group}=1$, $f(n_{group})=0$, when $N_{group}=2$, the time resource adjustment value $f(n_{group})$ is determined according to the formula (3a) or (3b), and when $N_{group}>2$, $$f(n_{group}) = \mathrm{mod}\left(f(n_{group}-1) + \mathrm{mod}\left(\sum_{k=n_{group} \cdot M}^{n_{group} \cdot M + M - 1} c(k) \times 2^{k-(n_{group} \cdot M)}, N_{group} - L\right) + L, N_{group}\right); \text{or} \quad (4a)$$

$$f(n_{group}) = f(n_{group}-1) + \mathrm{mod}\left(\sum_{k=n_{group} \cdot M}^{n_{group} \cdot M + M - 1} c(k) \times 2^{k-(n_{group} \cdot M)}, N_{group} - L\right) + L, \quad (4b)$$

where
L is a positive integer, and is $1 \leq L < N_{group}$.

It should be noted that, a pseudo-random sequence c(n) is a Gold sequence whose length is 31 and an output sequence whose length is $M_{PN}$, where n=0, 1, . . . , $M_{PN}-1$, and is defined in the following formula:

$$c(n) = \mathrm{mod}(x_1(n+N_C) + x_2(n+N_C), 2)$$

$$x_1(n+31) = \mathrm{mod}(x_1(n+3) + x_1(n), 2), \text{ where}$$

$$x_2(n+31) = \mathrm{mod}(x_2(n+3) + x_2(n+2) + x_2(n+1) + x_2(n), 2) \quad (5)$$

$N_C=1600$, the first sequence is initialized by using $x_1(0)=1, x_1(n)=0, n=1, 2, \ldots, 30$, and the second sequence is initialized by using $c_{init} = \sum_{i=0}^{30} x_2(i) \cdot 2^i$.

In addition, in the foregoing embodiment, referring to Table 1, time resources whose time resource numbers are different are used to send the data signal in the five time resource groups, and therefore, such an unfixed time resource interval is helpful in randomizing inter-cell interference.

Optionally, the multiple time resource numbers indicated by the indication signal are time resource numbers of the time resources occupied by the data signal in the N time resource groups, and the method further includes: obtaining, by the first user equipment, time resource pool information, where the time resource pool information includes a time resource pool sequence number, and time resources in a time resource pool corresponding to the time resource pool sequence number are equal to a sum of time resources in the N time resource groups, and determining, according to a formula:

$$\tilde{n}(n_{pool}) = \mathrm{mod}(\tilde{n}_{RPT} + f(n_{pool}), N_{pool}) \qquad (6)$$

a time resource number $\tilde{n}(n_{pool})$ that is in each time resource group and occupied by the data signal in a time resource pool $n_{pool}$, where mod( ) is a mod function, $n_{pool}$ is a time resource pool sequence number, a value of $n_{pool}$ is zero or a positive integer, $\tilde{n}_{RPT}$ is any time resource number in the multiple time resource numbers indicated by the indication signal, a value of $\tilde{n}_{RPT}$ is zero or a positive integer, $N_{pool}$ is a quantity of all possible time resource numbers that are in the time resource groups and occupied by the data signal in the time resource pool $n_{pool}$, a value of $N_{pool}$ is a positive integer, for example, as shown in Table 1, $N_{pool} = 4^5 = 1024$, and $f(n_{pool})$ is a time resource adjustment value in the time resource pool $n_{pool}$.

Specifically, referring to Table 1, for example, if 10 bits in the RPT field are 0001101110, it indicates that five subframes such as a time resource number 0 in a time resource group 0, a time resource number 1 in a time resource group 1, a time number 2 in a time resource group 2, a time resource number 3 in a time resource group 3, and a time resource number 2 in a time resource group 4 are used to send the data signal, that is, the multiple time resource numbers indicated by the indication signal are time resource numbers of the time resources occupied by the data signal in the N time resource groups.

It should be understood that, after time resources are grouped by using the sum of the time resources in the N time resource groups as a time resource pool, if time resources indicated by the 10 bits 0001101110 in the RPT field are used to send the data signal in all time resource pools, such a fixed time resource interval is not helpful in randomizing inter-cell interference. For example, if two user equipments in two cells both use time resources indicated by 10 bits 0001101110 in the foregoing RPT field, to send data signals, the data signals of the two user equipments always collide with each other.

To overcome the problem that exists in the foregoing embodiment, another embodiment is provided. When $N_{pool}=1$, $f(n_{pool})=0$, and when $N_{pool}\geq 2$, $$f(n_{pool}) = \mathrm{mod}\left(\sum_{k=n_{pool}\cdot M}^{n_{pool}\cdot M + M - 1} c(k) \times 2^{k-(n_{pool}\cdot M)}, N_{pool}\right); \text{ or} \qquad (7a)$$

$$f(n_{pool}) = \sum_{k=n_{pool}\cdot M}^{n_{pool}\cdot M + M - 1} c(k) \times 2^{k-(n_{pool}\cdot M)}, \qquad (7b)$$

where

M is a positive integer not less than $\log_2{}^{N_{pool}}$, for example, M shown in Table 1 is 10, and c(k) is a pseudo-random sequence.

Optionally, when $N_{pool}=1$, $f(n_{pool})=0$, and when $N_{pool}\geq 2$, $$f(n_{pool}) = \mathrm{mod}\left(f(n_{pool} - 1) + \sum_{k=n_{pool}\cdot M}^{n_{pool}\cdot M + M - 1} c(k) \times 2^{k-(n_{pool}\cdot M)}, N_{pool}\right); \qquad (8a)$$

or $$f(n_{pool}) = f(n_{pool} - 1) + \sum_{k=n_{pool}\cdot M}^{n_{pool}\cdot M + M - 1} c(k) \times 2^{k-(n_{pool}\cdot M)}, \qquad (8b)$$

where

M is a positive integer not less than $\log_2{}^{N_{pool}}$, for example, M shown in Table 1 is 10, c(k) is a pseudo-random sequence, and $f(-1)=0$.

Optionally, when $N_{pool}=1$, $f(n_{pool})=0$, when $N_{pool}=2$, the time resource adjustment value $f(n_{pool})$ is determined according to the formula (8a) or (8b), and when $N_{pool}>2$, $$f(n_{pool}) = \mathrm{mod}\left(f(n_{pool} - 1) + \right. \qquad (9a)$$

$$\left. \mathrm{mod}\left(\sum_{k=n_{pool}\cdot M}^{n_{pool}\cdot M + M - 1} c(k) \times 2^{k-(n_{pool}\cdot M)}, N_{pool} - L\right) + L, N_{pool}\right); \text{ or}$$

$$f(n_{pool}) = \qquad (9b)$$

$$f(n_{pool} - 1) + \mathrm{mod}\left(\sum_{k=n_{pool}\cdot M}^{n_{pool}\cdot M + M - 1} c(k) \times 2^{k-(n_{pool}\cdot M)}, N_{pool} - L\right) + L,$$

where

L is a positive integer, and is $1 \leq L < N_{pool}$.

It should be noted that, a pseudo-random sequence c(n) is a Gold sequence whose length is 31 and an output sequence whose length is $M_{PN}$, where n=0, 1, . . . , $M_{PN}-1$, and is defined in the formula (5).

In addition, in the foregoing embodiment, time resources corresponding to different time resource numbers in the N time resource groups are used to send the data signal in each time resource pool, and therefore, such an unfixed time resource interval is helpful in randomizing inter-cell interference.

Optionally, an initialization sequence of the pseudo-random sequence c(k) is $c_{init}=N_{ID}^{cell}$, or $c_{init}=510$, or $c_{init}=2^9 \cdot \mathrm{mod}(n_f, 4) + N_{ID}^{cell}$, or $c_{init}=2^9 \cdot \mathrm{mod}(n_f, 4) + 510$, where $N_{ID}^{cell}$ is a physical cell identifier, and $n_f$ is a system frame number.

Optionally, that first user equipment obtains time resource grouping information includes: obtaining, by the first user equipment, the time resource grouping information according to a correspondence between a time resource number and a time resource, where the correspondence between a time resource number and a time resource is preset, or is fed back by a receive end, or is provided by a third party, for example, a base station.

Optionally, the time resource grouping information includes: the time resources, for example, 20 subframes, are grouped into N groups, for example, five groups, each time resource group includes k time resources, where k is a positive integer, and time resource numbers in each time resource group are 0, 1, . . . , k−1.

Therefore, in this embodiment of the present invention, a time resource bearing a data signal can be accurately indicated. Therefore, a receive end can receive the data signal without performing blind detection, which reduces a processing time and energy consumption of the receive end.

The foregoing describes the data transmission method according to the embodiment of the present invention from a perspective of user equipment at a transmit end with reference to FIG. 1, and the following describes a data transmission method according to an embodiment of the present invention from a perspective of user equipment at a receive end with reference to FIG. 2. FIG. 2 provides a description from a perspective of user equipment used as a receive end. It should be noted that, user equipment may be a transmit end or may be a receive end.

FIG. 2 shows another data transmission method 200 according to an embodiment of the present invention. The method 200 includes the following steps.

S210. Second user equipment obtains time resource grouping information, where the time resource grouping information includes time resource numbers in N time resource groups, and N is a positive integer.

Specifically, quantities of time resource numbers in the N time resource groups may be the same or different. The time resource grouping information may be sent by a third party, for example, a base station or a transmit end, or may be preset in the user equipment. This is not limited in this embodiment of the present invention. The second user equipment may obtain, for example, the time resource numbers in the N time resource groups and the time resource grouping information that are shown in Table 1.

S220. The second user equipment receives an indication signal, for example, a scheduling assignment signal (English: Scheduling Assignment, SA for short), where the indication signal indicates one or more time resource numbers.

Specifically, the second user equipment may receive the indication signal according to scheduling information of a base station. This is not limited in this embodiment of the present invention. For example, the second user equipment may receive the indication signal according to an indication of a transmit end, or may receive the indication signal according to a pre-configuration.

S230. The second user equipment determines, according to the time resource grouping information and the one or more time resource numbers indicated by the indication signal, time resources (for example, time resource numbers) occupied by a data signal in the N time resource groups. For example, the data signal occupies only one time resource number in each time resource group.

It should be understood that, the second user equipment may determine, by using multiple methods, a time resource, that is, a time resource number, occupied by the data signal in each of the N time resource groups. The data signal may occupy one or more time resource numbers in each time resource group. This is not limited in this embodiment of the present invention.

S240. The second user equipment obtains the data signal according to the time resources (that is, time resources corresponding to the time resource numbers) occupied by the data signal in the N time resource groups.

It should be understood that, the second user equipment may obtain the data signal by using multiple methods. This is not limited in this embodiment of the present invention.

The foregoing describes the data transmission method according to the embodiment of the present invention from a perspective of the second user equipment with reference to FIG. 2.

The following provides a more detailed description of the embodiment of the present invention with reference to specific examples. It should be noted that, the example in FIG. 2 is merely intended to help a person skilled in the art understand the embodiment of the present invention, rather than to limit the embodiment of the present invention to the exemplary specific value or specific scenario. Apparently, a person skilled in the art can make various equivalent modifications or variations according to the example provided in FIG. 2, and such modifications or variations also fall within the scope of the embodiments of the present invention.

According to this embodiment of the present invention, that the indication signal indicates the one or more time resource numbers includes: the indication signal includes a resource pattern of transmission (English: Resource Pattern of Transmission, RPT for short) field, and the resource pattern of transmission field is used to indicate the one or more time resource numbers.

Specifically, referring to Table 1, for example, 2 bits 00 in the RPT field indicates a time resource number 0; 2 bits 01 in the RPT field indicates a time resource number 1; 2 bits 10 in the RPT field indicates a time resource number 2; and 2 bits 11 in the RPT field indicates a time resource number 3. Another time resource number may be represented by more bits in the RPT field. This is not limited in this embodiment of the present invention.

Optionally, time resource numbers of the time resources occupied by the data signal in the N time resource groups are the same.

Specifically, referring to Table 1, for example, when the RPT is 00, it indicates a time resource number 0. If time resources whose time resource numbers are 0 are used to send the data signal in all five time resource groups, such a fixed time resource interval is not helpful in randomizing inter-cell interference. For example, if two user equipments in two cells both use time resources corresponding to time resource numbers 0 to send data signals, the data signals of the two user equipments always collide with each other.

To overcome the problem that exists in the foregoing embodiment, another embodiment is provided. That the second user equipment determines, according to the time resource grouping information and the one or more time resource numbers indicated by the indication signal, time resources occupied by the data signal in the N time resource groups includes: determining, by the second user equipment according to the formula (1), a time resource number $\tilde{n}(n_{group})$ occupied by the data signal in a time resource group $n_{group}$.

Optionally, when $N_{group}=1$, $f(n_{group})=0$, and when $N_{group} \geq 2$, the time resource adjustment value $f(n_{group})$ is determined according to the formula (2a) or (2b).

Optionally, when $N_{group}=1$, $f(n_{group})=0$, and when $N_{group} \geq 2$, the time resource adjustment value $f(n_{group})$ is determined according to the formula (3a) or (3b).

Optionally, when $N_{group}=1$, $f(n_{group})=0$, when $N_{group} \geq 2$, the time resource adjustment value $f(n_{group})$ is determined according to the formula (3a) or (3b), and when $N_{group}>2$, the time resource adjustment value $f(n_{group})$ is determined according to the formula (4a) or (4b).

In addition, in the foregoing embodiment, referring to Table 1, time resources whose time resource numbers are different are used to send the data signal in the five time resource groups, and therefore, such an unfixed time resource interval is helpful in randomizing inter-cell interference.

Optionally, the multiple time resource numbers indicated by the indication signal are time resource numbers of the time resources occupied by the data signal in the N time resource groups, and the method further includes: obtaining, by the second user equipment, time resource pool information, where the time resource pool information includes a time resource pool sequence number, and time resources in a time resource pool corresponding to the time resource pool sequence number are equal to a sum of time resources in the N time resource groups, and determining, according to the formula (6), a time resource number $\tilde{n}(n_{pool})$ that is in each time resource group and occupied by the data signal in a time resource pool $n_{pool}$.

Specifically, referring to Table 1, for example, if 10 bits in the RPT field are 0001101110, it indicates that five subframes such as a time resource number 0 in a time resource group 0, a time resource number 1 in a time resource group 1, a time number 2 in a time resource group 2, a time resource number 3 in a time resource group 3, and a time resource number 2 in a time resource group 4 are used to send the data signal, that is, the multiple time resource numbers indicated by the indication signal are time resource numbers of the time resources occupied by the data signal in the N time resource groups.

It should be understood that, after time resources are grouped by using the sum of the time resources in the N time resource groups as a time resource pool, if time resources indicated by the 10 bits 0001101110 in the RPT field are used to send the data signal in all time resource pools, such a fixed time resource interval is not helpful in randomizing inter-cell interference. For example, if two user equipments in two cells both use time resources indicated by 10 bits 0001101110 in the foregoing RPT field, to send data signals, the data signals of the two user equipments always collide with each other.

To overcome the problem that exists in the foregoing embodiment, another embodiment is provided. When $N_{pool}=1$, $f(n_{pool})=0$, and when $N_{pool}\geq 2$, the time resource adjustment value $f(n_{pool})$ is determined according to the formula (7a) or (7b).

Optionally, when $N_{pool}=1$, $f(n_{pool})=0$, and when $N_{pool}\geq 2$, the time resource adjustment value $f(n_{pool})$ is determined according to the formula (8a) or (8b).

Optionally, when $N_{pool}=1$, $f(n_{pool})=0$, when $N_{pool}=2$, the time resource adjustment value $f(n_{pool})$ is determined according to the formula (8a) or (8b), and when $N_{pool}>2$, the time resource adjustment value $f(n_{pool})$ is determined according to the formula (9a) or (9b).

In addition, in the foregoing embodiment, time resources corresponding to different time resource numbers in the N time resource groups are used to send the data signal in each time resource pool, and therefore, such an unfixed time resource interval is helpful in randomizing inter-cell interference.

Optionally, an initialization sequence of the pseudo-random sequence c(k) is $c_{init}=N_{ID}^{cell}$, or $c_{init}=510$, or $c_{init}=2^9 \cdot mod(n_f, 4) + N_{ID}^{cell}$, or $c_{init}=2^9 \cdot mod(n_f, 4) + 510$, where $N_{ID}^{cell}$ is a physical cell identifier, and $n_f$ is a system frame number.

Optionally, that second user equipment obtains time resource grouping information includes: obtaining, by the second user equipment, the time resource grouping information according to a correspondence between a time resource number and a time resource, where the correspondence between a time resource number and a time resource is preset, or is fed back by a transmit end, or is provided by a third party, for example, a base station.

Optionally, the time resource grouping information includes: the time resources, for example, 20 subframes, are grouped into N groups, for example, five groups, each time resource group includes k time resources, where k is a positive integer, and time resource numbers in each time resource group are 0, 1, . . . , k−1.

According to this embodiment of the present invention, that the second user equipment obtains the data signal on the time resources occupied by the data signal in the N time resource groups includes: determining, by the second user equipment according to a correspondence between a time resource number and a time resource that are occupied by the data signal in the N time resource groups, the time resources corresponding to the resource numbers, and obtaining the data signal on the time resources occupied by the data signal in the N time resource groups, where the correspondence between a time resource number and a time resource that are occupied by the data signal in the N time resource groups is preset, or is obtained from a transmit end, or is obtained from a third party, for example, a base station.

Optionally, the method further includes: receiving, by the second user equipment, a correspondence between a time resource number and a time resource.

In this embodiment of the present invention, a time resource bearing a data signal can be accurately indicated. Therefore, second user equipment can receive the data signal without performing blind detection, which reduces a processing time and electrical energy consumption of a receive end.

The foregoing describes in detail the data transmission method according to the embodiments of the present invention with reference to FIG. 1 to FIG. 2, and the following describes in detail user equipment according to embodiments of the present invention with reference to FIG. 3 to FIG. 6.

Figure 3:
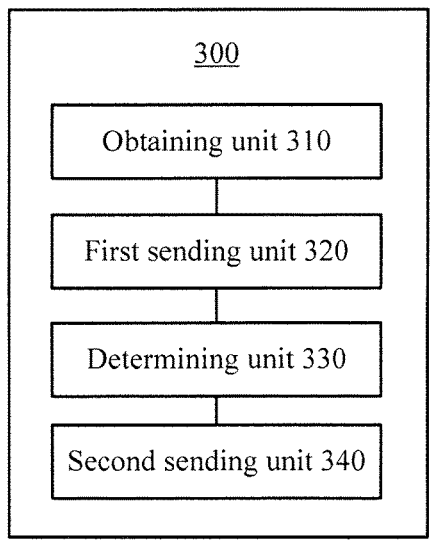
FIG. 3 is a schematic block diagram of user equipment according to an embodiment of the present invention.

FIG. 3 shows a schematic block diagram of user equipment 300 according to an embodiment of the present invention. As shown in FIG. 3, the user equipment 300 includes an obtaining unit 310, a first sending unit 320, a determining unit 330, and a second sending unit 340.

The obtaining unit 310 is configured to obtain time resource grouping information, where the time resource grouping information includes time resource numbers in N time resource groups, and N is a positive integer.

Specifically, quantities of time resource numbers in the N time resource groups may be the same or different. The obtaining unit 310 may obtain the time resource numbers in the N time resource groups and the time resource grouping information that are shown in Table 1. The time resource grouping information may be sent by a third party, for example, a base station or a receive end, or may be preset in the user equipment. This is not limited in this embodiment of the present invention.

The first sending unit 320 is configured to send an indication signal, for example, a scheduling assignment signal (English: Scheduling Assignment, SA for short), where the indication signal indicates one or more time resource numbers.

Specifically, the first sending unit 320 may send the indication signal according to scheduling information of a base station. This is not limited in this embodiment of the present invention. For example, the first sending unit 320 may send the indication signal according to a feedback from a receive end, or may send the indication signal according to a pre-configuration.

The determining unit 330 is configured to determine, according to the time resource grouping information and the one or more time resource numbers indicated by the indication signal, time resources (that is, time resource numbers) occupied by a data signal in the N time resource groups. For example, the data signal occupies only one time resource number in each time resource group.

The second sending unit 340 is configured to send the data signal by using the time resources (that is, time resources corresponding to the time resource numbers) occupied by the data signal in the N time resource groups.

The foregoing describes in detail the user equipment 300 according to the embodiment of the present invention with reference to FIG. 3.

The following provides a more detailed description of the embodiment of the present invention with reference to specific examples. It should be noted that, the example in FIG. 3 is merely intended to help a person skilled in the art understand the embodiment of the present invention, rather than to limit the embodiment of the present invention to the exemplary specific value or specific scenario. Apparently, a person skilled in the art can make various equivalent modifications or variations according to the example provided in FIG. 3, and such modifications or variations also fall within the scope of the embodiments of the present invention.

According to this embodiment of the present invention, that the indication signal indicates the one or more time resource numbers includes: the indication signal includes a resource pattern of transmission (English: Resource Pattern of Transmission, RPT for short) field, and the resource pattern of transmission field is used to indicate the one or more time resource numbers.

Specifically, referring to Table 1, for example, 2 bits 00 in the RPT field indicates a time resource number 0; 2 bits 01 in the RPT field indicates a time resource number 1; 2 bits 10 in the RPT field indicates a time resource number 2; and 2 bits 11 in the RPT field indicates a time resource number 3. Another time resource number may be represented by more bits in the RPT field. This is not limited in this embodiment of the present invention.

Optionally, time resource numbers of the time resources occupied by the data signal in the N time resource groups are the same.

Specifically, referring to Table 1, for example, when the RPT is 00, it indicates a time resource number 0. If time resources whose time resource numbers are 0 are used to send the data signal in all five time resource groups, such a fixed time resource interval is not helpful in randomizing inter-cell interference. For example, if two user equipments in two cells both use time resources corresponding to time resource numbers 0 to send data signals, the data signals of the two user equipments always collide with each other.

To overcome the problem that exists in the foregoing embodiment, another embodiment is provided. The determining unit 330 is specifically configured to determine, according to the formula (1), a time resource number $\tilde{n}(n_{group})$ occupied by the data signal in a time resource group $n_{group}$.

It should be understood that, the time resource adjustment value $f(n_{group})$ may be a random number, or any value determined in another manner. This is not limited in this embodiment of the present invention.

Optionally, when $N_{group}=1$, $f(n_{group})=0$, and when $N_{group}\geq 2$, the time resource adjustment value $f(n_{group})$ is determined according to the formula (2a) or (2b).

Optionally, when $N_{group}=1$, $f(n_{group})=0$, and when $N_{group}\geq 2$, the time resource adjustment value $f(n_{group})$ is determined according to the formula (3a) or (3b).

Optionally, when $N_{group}=1$, $f(n_{group})=0$, when $N_{group}=2$, the time resource adjustment value $f(n_{group})$ is determined according to the formula (3a) or (3b), and when $N_{group}>2$, the time resource adjustment value $f(n_{group})$ is determined according to the formula (4a) or (4b).

In addition, in the foregoing embodiment, referring to Table 1, time resources whose time resource numbers are different are used to send the data signal in the five time resource groups, and therefore, such an unfixed time resource interval is helpful in randomizing inter-cell interference.

Optionally, the multiple time resource numbers indicated by the indication signal are time resource numbers of the time resources occupied by the data signal in the N time resource groups; the obtaining unit 310 is specifically configured to obtain time resource pool information, where the time resource pool information includes a time resource pool sequence number, and time resources in a time resource pool corresponding to the time resource pool sequence number are equal to a sum of time resources in the N time resource groups; and the determining unit 330 is specifically configured to determine, according to the formula (6), a time resource number $\tilde{n}(n_{pool})$ that is in each time resource group and occupied by the data signal in a time resource pool $n_{pool}$.

Specifically, referring to Table 1, for example, if 10 bits in the RPT field are 0001101110, it indicates that five subframes such as a time resource number 0 in a time resource group 0, a time resource number 1 in a time resource group 1, a time number 2 in a time resource group 2, a time resource number 3 in a time resource group 3, and a time resource number 2 in a time resource group 4 are used to send the data signal, that is, the multiple time resource numbers indicated by the indication signal are time resource numbers of the time resources occupied by the data signal in the N time resource groups.

It should be understood that, after time resources are grouped by using the sum of the time resources in the N time resource groups as a time resource pool, if time resources indicated by the 10 bits 0001101110 in the RPT field are used to send the data signal in all time resource pools, such a fixed time resource interval is not helpful in randomizing inter-cell interference. For example, if two user equipments in two cells both use time resources indicated by 10 bits 0001101110 in the foregoing RPT field, to send data signals, the data signals of the two user equipments always collide with each other.

To overcome the problem that exists in the foregoing embodiment, another embodiment is provided. When $N_{pool}=1$, $f(n_{pool})=0$, and when $N_{pool}\geq 2$, the time resource adjustment value $f(n_{pool})$ is determined according to the formula (7a) or (7b).

Optionally, when $N_{pool}=1$, $f(n_{pool})=0$, and when $N_{pool}\geq 2$, the time resource adjustment value $f(n_{pool})$ is determined according to the formula (8a) or (8b).

Optionally, when $N_{pool}=1$, $f(n_{pool})=0$, when $N_{pool}=2$, the time resource adjustment value $f(n_{pool})$ is determined according to the formula (8a) or (8b), and when $N_{pool}>2$, the time resource adjustment value $f(n_{pool})$ is determined according to the formula (9a) or (9b).

In addition, in the foregoing embodiment, time resources corresponding to different time resource numbers in the N time resource groups are used to send the data signal in each time resource pool, and therefore, such an unfixed time resource interval is helpful in randomizing inter-cell interference.

Optionally, an initialization sequence of the pseudo-random sequence c(k) is $c_{init}=N_{ID}^{cell}$, or $c_{init}=510$, or $c_{init}=2^9 \cdot \text{mod}(n_f, 4)+N_{ID}^{cell}$, or $c_{init}=2^9 \cdot \text{mod}(n_f, 4)+510$, where $N_{ID}^{cell}$ is a physical cell identifier, and $n_f$ is a system frame number.

Optionally, the obtaining unit 310 is specifically configured to obtain the time resource grouping information according to a correspondence between a time resource number and a time resource, where the correspondence between a time resource number and a time resource is preset, or is fed back by a receive end, or is provided by a third party, for example, a base station.

Optionally, the time resource grouping information includes: the time resources, for example, 20 subframes, are grouped into N groups, for example, five groups, each time resource group includes k time resources, where k is a positive integer, and time resource numbers in each time resource group are 0, 1, . . . , k−1.

Therefore, in this embodiment of the present invention, a time resource bearing a data signal can be accurately indicated. Therefore, a receive end can receive the data signal without performing blind detection, which reduces a processing time and energy consumption of the receive end.

Figure 4:
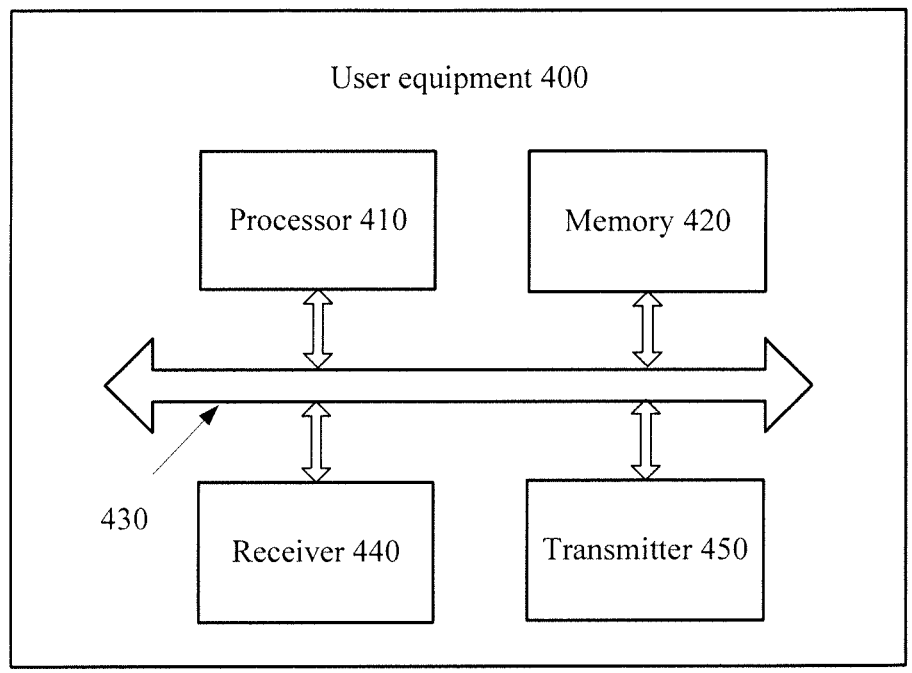
FIG. 4 is a schematic block diagram of user equipment according to another embodiment of the present invention.

From a perspective of another implementation manner, as shown in FIG. 4, an embodiment of the present invention further provides user equipment 400. The user equipment 400 includes a processor 410, a memory 420, a bus system 430, a receiver 440, and a transmitter 450. The processor 410, the memory 420, the receiver 440, and the transmitter 450 are connected to each other by using the bus system 430. The memory 420 is configured to store an instruction. The processor 410 is configured to execute the instruction stored in the memory 420, to control the receiver 440 to receive a signal or an instruction or a message and control the transmitter 450 to send a signal or signaling or a message or the like. The processor 410 is configured to: obtain time resource grouping information, where the time resource grouping information includes time resource numbers in N time resource groups, and N is a positive integer, and determine, according to the time resource grouping information and one or more time resource numbers indicated by an indication signal sent by the transmitter 450, time resources (that is, time resource numbers) occupied by a data signal in the N time resource groups. For example, the data signal occupies only one time resource number in each time resource group. The transmitter 450 is configured to: send the indication signal, for example, a scheduling assignment signal (English: Scheduling Assignment, SA for short), where the indication signal indicates the one or more time resource numbers, and send the data signal by using the time resources (that is, time resources corresponding to the time resource numbers) occupied by the data signal in the N time resource groups.

The foregoing describes in detail the user equipment 400 according to the embodiment of the present invention with reference to FIG. 4.

The following provides a more detailed description of the embodiment of the present invention with reference to specific examples. It should be noted that, the example in FIG. 4 is merely intended to help a person skilled in the art understand the embodiment of the present invention, rather than to limit the embodiment of the present invention to the exemplary specific value or specific scenario. Apparently, a person skilled in the art can make various equivalent modifications or variations according to the example provided in FIG. 4, and such modifications or variations also fall within the scope of the embodiments of the present invention.

According to this embodiment of the present invention, that the indication signal indicates the one or more time resource numbers includes: the indication signal includes a resource pattern of transmission (English: Resource Pattern of Transmission, RPT for short) field, and the resource pattern of transmission field is used to indicate the one or more time resource numbers.

Specifically, referring to Table 1, for example, 2 bits 00 in the RPT field indicates a time resource number 0; 2 bits 01 in the RPT field indicates a time resource number 1; 2 bits 10 in the RPT field indicates a time resource number 2; and 2 bits 11 in the RPT field indicates a time resource number 3. Another time resource number may be represented by more bits in the RPT field. This is not limited in this embodiment of the present invention.

Optionally, time resource numbers of the time resources occupied by the data signal in the N time resource groups are the same.

Specifically, referring to Table 1, for example, when the RPT is 00, it indicates a time resource number 0. If time resources whose time resource numbers are 0 are used to send the data signal in all five time resource groups, such a fixed time resource interval is not helpful in randomizing inter-cell interference. For example, if two user equipments in two cells both use time resources corresponding to time resource numbers 0 to send data signals, the data signals of the two user equipments always collide with each other.

To overcome the problem that exists in the foregoing embodiment, another embodiment is provided. The processor 410 determines, according to the formula (1), a time resource number $\tilde{n}(n_{group})$ occupied by the data signal in a time resource group $n_{group}$.

It should be understood that, the time resource adjustment value $f(n_{group})$ may be a random number, or any value determined in another manner. This is not limited in this embodiment of the present invention.

Optionally, when $N_{group}=1$, $f(n_{group})=0$, and when $N_{group} \geq 2$, the time resource adjustment value $f(n_{group})$ is determined according to the formula (2a) or (2b).

Optionally, when $N_{group}=1$, $f(n_{group})=0$, and when $N_{group} \geq 2$, the time resource adjustment value $f(n_{group})$ is determined according to the formula (3a) or (3b).

Optionally, when $N_{group}=1$, $f(n_{group})=0$, when $N_{group}=2$, the time resource adjustment value $f(n_{group})$ is determined according to the formula (3a) or (3b), and when $N_{group}>2$, the time resource adjustment value $f(n_{group})$ is determined according to the formula (4a) or (4b).

In addition, in the foregoing embodiment, referring to Table 1, time resources whose time resource numbers are different are used to send the data signal in the five time resource groups, and therefore, such an unfixed time resource interval is helpful in randomizing inter-cell interference.

Optionally, the multiple time resource numbers indicated by the indication signal are time resource numbers of the time resources occupied by the data signal in the N time resource groups, and the processor 410 obtains time resource pool information, where the time resource pool information includes a time resource pool sequence number, and time resources in a time resource pool corresponding to the time resource pool sequence number are equal to a sum of time resources in the N time resource groups; and determines, according to the formula (6), a time resource number $\tilde{n}(n_{pool})$ that is in each time resource group and occupied by the data signal in a time resource pool $n_{pool}$.

Specifically, referring to Table 1, for example, if 10 bits in the RPT field are 0001101110, it indicates that five subframes such as a time resource number 0 in a time resource group 0, a time resource number 1 in a time resource group 1, a time number 2 in a time resource group 2, a time resource number 3 in a time resource group 3, and a time resource number 2 in a time resource group 4 are used to send the data signal, that is, the multiple time resource numbers indicated by the indication signal are time resource numbers of the time resources occupied by the data signal in the N time resource groups.

It should be understood that, after time resources are grouped by using the sum of the time resources in the N time resource groups as a time resource pool, if time resources indicated by the 10 bits 0001101110 in the RPT field are used to send the data signal in all time resource pools, such a fixed time resource interval is not helpful in randomizing inter-cell interference. For example, if two user equipments in two cells both use time resources indicated by 10 bits 0001101110 in the foregoing RPT field, to send data signals, the data signals of the two user equipments always collide with each other.

To overcome the problem that exists in the foregoing embodiment, another embodiment is provided. When $N_{pool}=1$, $f(n_{pool})=0$, and when $N_{pool}\geq 2$, the time resource adjustment value $f(n_{pool})$ is determined according to the formula (7a) or (7b).

Optionally, when $N_{pool}=1$, $f(n_{pool})=0$, and when $N_{pool}\geq 2$, the time resource adjustment value $f(n_{pool})$ is determined according to the formula (8a) or (8b).

Optionally, when $N_{pool}=1$, $f(n_{pool})=0$, when $N_{pool}=2$, the time resource adjustment value $f(n_{pool})$ is determined according to the formula (8a) or (8b), and when $N_{pool}\geq 2$, the time resource adjustment value $f(n_{pool})$ is determined according to the formula (9a) or (9b).

In addition, in the foregoing embodiment, time resources corresponding to different time resource numbers in the N time resource groups are used to send the data signal in each time resource pool, and therefore, such an unfixed time resource interval is helpful in randomizing inter-cell interference.

Optionally, an initialization sequence of the pseudo-random sequence c(k) is $c_{init}=N_{ID}^{cell}$, or $c_{init}$510, or $c_{init}=2^9 \cdot mod(n_f, 4)+N_{ID}^{cell}$, or $c_{init}=2^9 \cdot mod(n_f, 4)+510$, where $N_{ID}^{cell}$ is a physical cell identifier, and $n_f$ is a system frame number.

Optionally, the processor 410 obtains the time resource grouping information according to a correspondence between a time resource number and a time resource, where the correspondence between a time resource number and a time resource is preset, or is fed back by a receive end, or is provided by a third party, for example, a base station.

Optionally, the time resource grouping information includes: the time resources, for example, 20 subframes, are grouped into N groups, for example, five groups, each time resource group includes k time resources, where k is a positive integer, and time resource numbers in each time resource group are n=0, 1, . . . , k−1.

Therefore, in this embodiment of the present invention, a time resource bearing a data signal can be accurately indicated. Therefore, a receive end can receive the data signal without performing blind detection, which reduces a processing time and energy consumption of the receive end.

It should be understood that in this embodiment of the present invention, the processor 410 may be a central processing unit (Central Processing Unit, CPU for short), or the processor 410 may be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor, or the like.

The memory 420 may include a read-only memory and a random access memory, and provide an instruction and data to the processor 410. A part of the memory 420 may further include a non-volatile random access memory. For example, the memory 420 may further store device type information.

The bus system 430 may include a power bus, a control bus, a status signal bus, and the like in addition to a data bus. However, for clear description, various types of buses are marked as the bus system 430 in the figure.

In an implementation process, the steps in the foregoing methods may be completed by using an integrated logic circuit of hardware in the processor 410 or an instruction in a form of software. The steps in the method disclosed with reference to the embodiments of the present invention may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, a register, or the like. The storage medium is located in the memory 420, and the processor 410 reads information from the memory 420 and completes the steps in the foregoing methods in combination with hardware in the processor. To avoid repetition, details are not described herein again.

It should be understood that the user equipment 300 and the user equipment 400 according to the embodiments of the present invention may be corresponding to the first user equipment in the data transmission method in the embodiments of the present invention. The foregoing and other operations and/or functions of the modules in the user equipment 300 and the user equipment 400 are separately used to implement corresponding procedures of the methods in FIG. 1. For brevity, details are not described herein.

In addition, a computer readable medium (or medium) is further provided, and includes a computer readable instruction for performing the following operation when the instruction is being executed: performing the operations of S110 to S140 in the method in the foregoing embodiment.

In addition, a computer program product is further provided, and includes the foregoing computer readable medium.

Figure 5:
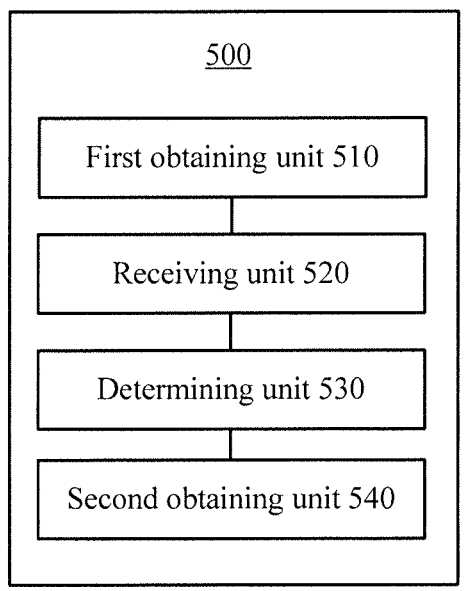
FIG. 5 is a schematic block diagram of user equipment according to still another embodiment of the present invention.
Figure 6:
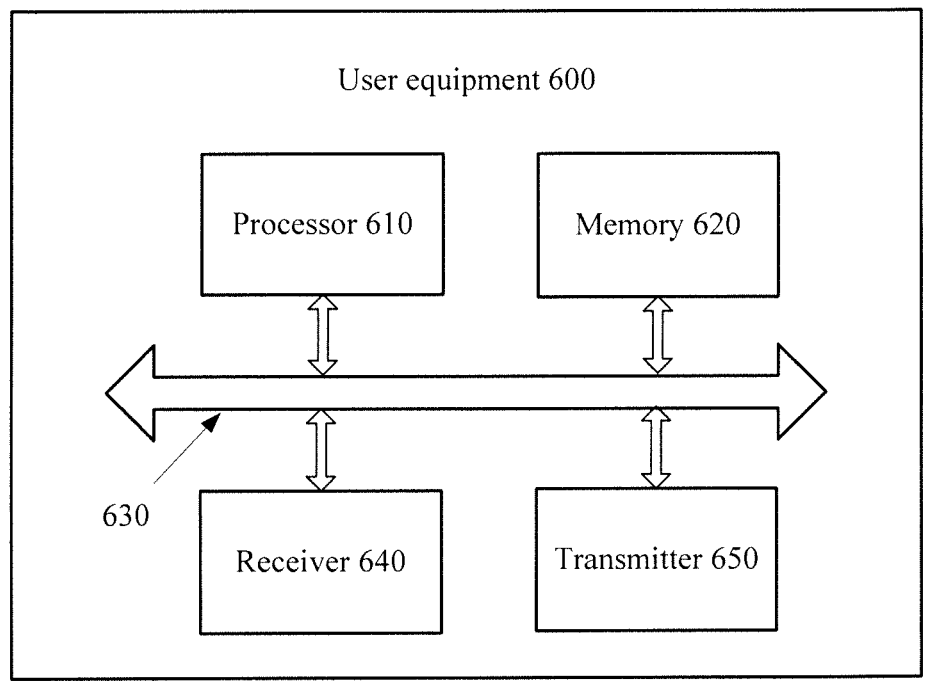
FIG. 6 is a schematic block diagram of user equipment according to yet another embodiment of the present invention.

The foregoing describes in detail user equipment at a transmit end according to the embodiments of the present invention with reference to FIG. 3 and FIG. 4, and the following describes in detail user equipment at a receive end according to embodiments of the present invention with reference to FIG. 5 and FIG. 6.

FIG. 5 shows a schematic block diagram of user equipment 500 according to an embodiment of the present invention. As shown in FIG. 5, the user equipment 500 includes a first obtaining unit 510, a receiving unit 520, a determining unit 530, and a second obtaining unit 540.

The first obtaining unit 510 is configured to obtain time resource grouping information, where the time resource grouping information includes time resource numbers in N time resource groups, and N is a positive integer.

It should be understood that, quantities of time resource numbers in the N time resource groups may be the same or different. The time resource grouping information may be sent by a third party, for example, a base station or a transmit end, or may be preset in the user equipment. This is not limited in this embodiment of the present invention.

Specifically, the first obtaining unit 510 may obtain, for example, the time resource numbers in the N time resource groups and the time resource grouping information that are shown in Table 1.

The receiving unit 520 is configured to receive an indication signal, for example, a scheduling assignment signal (English: Scheduling Assignment, SA for short), where the indication signal indicates one or more time resource numbers.

Specifically, the receiving unit 520 may receive the indication signal according to scheduling information of a base station. This is not limited in this embodiment of the present invention. For example, the second user equipment may receive the indication signal according to an indication of a transmit end, or may receive the indication signal according to a pre-configuration.

The determining unit 530 is configured to determine, according to the time resource grouping information and the one or more time resource numbers indicated by the indication signal, time resources (that is, time resource numbers) occupied by a data signal in the N time resource groups. For example, the data signal occupies only one time resource number in each time resource group.

It should be understood that, the determining unit 530 may determine, by using multiple methods, a time resource number occupied by the data signal in each of the N time resource groups. The data signal may occupy one or more time resource numbers in each time resource group. This is not limited in this embodiment of the present invention.

The second obtaining unit 540 is configured to obtain the data signal according to the time resources (that is, time resources corresponding to the time resource numbers) occupied by the data signal in the N time resource groups.

It should be understood that, the second obtaining unit 540 may obtain the data signal by using multiple methods. This is not limited in this embodiment of the present invention.

The foregoing describes in detail the user equipment according to the embodiment of the present invention with reference to FIG. 5.

The following provides a more detailed description of the embodiment of the present invention with reference to specific examples. It should be noted that, the example in FIG. 5 is merely intended to help a person skilled in the art understand the embodiment of the present invention, rather than to limit the embodiment of the present invention to the exemplary specific value or specific scenario. Apparently, a person skilled in the art can make various equivalent modifications or variations according to the example provided in FIG. 5, and such modifications or variations also fall within the scope of the embodiments of the present invention.

According to this embodiment of the present invention, that the indication signal indicates the one or more time resource numbers includes: the indication signal includes a resource pattern of transmission (English: Resource Pattern of Transmission, RPT for short) field, and the resource pattern of transmission field is used to indicate the one or more time resource numbers.

Specifically, referring to Table 1, for example, 2 bits 00 in the RPT field indicates a time resource number 0; 2 bits 01 in the RPT field indicates a time resource number 1; 2 bits 10 in the RPT field indicates a time resource number 2; and 2 bits 11 in the RPT field indicates a time resource number 3. Another time resource number may be represented by more bits in the RPT field. This is not limited in this embodiment of the present invention.

Optionally, time resource numbers of the time resources occupied by the data signal in the N time resource groups are the same.

Specifically, referring to Table 1, for example, when the RPT is 00, it indicates a time resource number 0. If time resources whose time resource numbers are 0 are used to send the data signal in all five time resource groups, such a fixed time resource interval is not helpful in randomizing inter-cell interference. For example, if two user equipments in two cells both use time resources corresponding to time resource numbers 0 to send data signals, the data signals of the two user equipments always collide with each other.

To overcome the problem that exists in the foregoing embodiment, another embodiment is provided. The determining unit 530 is specifically configured to determine, according to the formula (1), a time resource number $\tilde{n}(n_{group})$ occupied by the data signal in a time resource group $n_{group}$.

It should be understood that, the time resource adjustment value $f(n_{group})$ may be a random number, or any value determined in another manner. This is not limited in this embodiment of the present invention.

Optionally, when $N_{group}=1$, $f(n_{group})=0$, and when $N_{group}\geq 2$, the time resource adjustment value $f(n_{group})$ is determined according to the formula (2a) or (2b).

Optionally, when $N_{group}=1$, $f(n_{group})=0$, and when $N_{group}\geq 2$, the time resource adjustment value $f(n_{group})$ is determined according to the formula (3a) or (3b).

Optionally, when $N_{group}=1$, $f(n_{group})=0$, when $N_{group}=2$, the time resource adjustment value $f(n_{group})$ is determined according to the formula (3a) or (3b), and when $N_{group}>2$, the time resource adjustment value $f(n_{group})$ is determined according to the formula (4a) or (4b).

In addition, in the foregoing embodiment, referring to Table 1, time resources whose time resource numbers are different are used to send the data signal in the five time resource groups, and therefore, such an unfixed time resource interval is helpful in randomizing inter-cell interference.

Optionally, the multiple time resource numbers indicated by the indication signal are time resource numbers of the time resources occupied by the data signal in the N time resource groups; the first obtaining unit 510 is specifically configured to obtain time resource pool information, where the time resource pool information includes a time resource pool sequence number, and time resources in a time resource pool corresponding to the time resource pool sequence number are equal to a sum of time resources in the N time resource groups; and the determining unit 530 is specifically configured to determine, according to the formula (6), a time resource number $\tilde{n}(n_{pool})$ that is in each time resource group and occupied by the data signal in a time resource pool $n_{pool}$.

Specifically, referring to Table 1, for example, if 10 bits in the RPT field are 0001101110, it indicates that five subframes such as a time resource number 0 in a time resource group 0, a time resource number 1 in a time resource group 1, a time number 2 in a time resource group 2, a time resource number 3 in a time resource group 3, and a time resource number 2 in a time resource group 4 are used to send the data signal, that is, the multiple time resource numbers indicated by the indication signal are time resource numbers of the time resources occupied by the data signal in the N time resource groups.

It should be understood that, after time resources are grouped by using the sum of the time resources in the N time resource groups as a time resource pool, if time resources indicated by the 10 bits 0001101110 in the RPT field are used to send the data signal in all time resource pools, such a fixed time resource interval is not helpful in randomizing inter-cell interference. For example, if two user equipments in two cells both use time resources indicated by 10 bits 0001101110 in the foregoing RPT field, to send data signals, the data signals of the two user equipments always collide with each other.

To overcome the problem that exists in the foregoing embodiment, another embodiment is provided. When $N_{pool}=1$, $f(n_{pool})=0$, and when $N_{pool} \geq 2$, the time resource adjustment value $f(n_{pool})$ is determined according to the formula (7a) or (7b).

Optionally, when $N_{pool}=1$, $f(n_{pool})=0$, and when $N_{pool} \geq 2$, the time resource adjustment value $f(n_{pool})$ is determined according to the formula (8a) or (8b).

Optionally, when $N_{pool}=1$, $f(n_{pool})=0$, when $N_{pool}=2$, the time resource adjustment value $f(n_{pool})$ is determined according to the formula (8a) or (8b), and when $N_{pool}>2$, the time resource adjustment value $f(n_{pool})$ is determined according to the formula (9a) or (9b).

In addition, in the foregoing embodiment, time resources corresponding to different time resource numbers in the N time resource groups are used to send the data signal in each time resource pool, and therefore, such an unfixed time resource interval is helpful in randomizing inter-cell interference.

Optionally, an initialization sequence of the pseudo-random sequence c(k) is $c_{init}=N_{ID}^{cell}$, or $c_{init}=510$, or $c_{init}=2^9 \cdot \text{mod}(n_f, 4) + N_{ID}^{cell}$, or $c_{init}=2^9 \cdot \text{mod}(n_f, 4) + 510$, where $N_{ID}^{cell}$ is a physical cell identifier, and $n_f$ is a system frame number.

Optionally, the first obtaining unit 510 is specifically configured to obtain the time resource grouping information according to a correspondence between a time resource number and a time resource, where the correspondence between a time resource number and a time resource is preset, or is fed back by a transmit end, or is provided by a third party, for example, a base station.

Optionally, the time resource grouping information includes: the time resources, for example, 20 subframes, are grouped into N groups, for example, five groups, each time resource group includes k time resources, where k is a positive integer, and time resource numbers in each time resource group are n=0, 1, . . . , k−1.

According to this embodiment of the present invention, the second obtaining unit 540 is specifically configured to: determine, according to a correspondence between a time resource number and a time resource that are occupied by the data signal in the N time resource groups, the time resources corresponding to the resource numbers, and obtain the data signal on the time resources occupied by the data signal in the N time resource groups, where the correspondence between a time resource number and a time resource that are occupied by the data signal in the N time resource groups is preset, or is obtained from a transmit end, or is obtained from a third party, for example, a base station.

Optionally, the receiving unit 520 is specifically configured to receive a correspondence between a time resource number and a time resource.

Therefore, in this embodiment of the present invention, a time resource bearing a data signal can be accurately indicated. Therefore, a receive end can receive the data signal without performing blind detection, which reduces a processing time and energy consumption of the receive end.

From a perspective of another implementation manner, as shown in FIG. 6, an embodiment of the present invention further provides user equipment 600. The user equipment 600 includes a processor 610, a memory 620, a bus system 630, a receiver 640, and a transmitter 650. The processor 610, the memory 620, the receiver 640, and the transmitter 650 are connected to each other by using the bus system 630. The memory 620 is configured to store an instruction. The processor 610 is configured to execute the instruction stored in the memory 620, to control the receiver 640 to receive a signal or an instruction or a message and control the transmitter 650 to send a signal or an instruction or a message. The processor 610 is configured to: obtain time resource grouping information, where the time resource grouping information includes time resource numbers in N time resource groups, and N is a positive integer, determine, according to the time resource grouping information and one or more time resource numbers indicated by an indication signal received by the receiver 640, time resources (that is, time resource numbers) occupied by a data signal in the N time resource groups, where for example, the data signal occupies only one time resource number in each time resource group, and obtain the data signal according to the time resources occupied by the data signal in the N time resource groups. The receiver 640 is configured to receive the indication signal, for example, a scheduling assignment signal (English: Scheduling Assignment, SA for short), where the indication signal indicates the one or more time resource numbers.

The foregoing describes in detail the user equipment according to the embodiment of the present invention with reference to FIG. 6.

The following provides a more detailed description of the embodiment of the present invention with reference to specific examples. It should be noted that, the example in FIG. 6 is merely intended to help a person skilled in the art understand the embodiment of the present invention, rather than to limit the embodiment of the present invention to the exemplary specific value or specific scenario. Apparently, a person skilled in the art can make various equivalent modifications or variations according to the example provided in FIG. 6, and such modifications or variations also fall within the scope of the embodiments of the present invention.

According to this embodiment of the present invention, that the indication signal indicates the one or more time resource numbers includes: the indication signal includes a resource pattern of transmission (English: Resource Pattern of Transmission, RPT for short) field, and the resource pattern of transmission field is used to indicate the one or more time resource numbers.

Specifically, referring to Table 1, for example, 2 bits 00 in the RPT field indicates a time resource number 0; 2 bits 01 in the RPT field indicates a time resource number 1; 2 bits 10 in the RPT field indicates a time resource number 2; and 2 bits 11 in the RPT field indicates a time resource number 3. Another time resource number may be represented by more bits in the RPT field. This is not limited in this embodiment of the present invention.

Optionally, time resource numbers of the time resources occupied by the data signal in the N time resource groups are the same.

Specifically, referring to Table 1, for example, when the RPT is 00, it indicates a time resource number 0. If time resources whose time resource numbers are 0 are used to send the data signal in all five time resource groups, such a fixed time resource interval is not helpful in randomizing inter-cell interference. For example, if two user equipments in two cells both use time resources corresponding to time resource numbers 0 to send data signals, the data signals of the two user equipments always collide with each other.

To overcome the problem that exists in the foregoing embodiment, another embodiment is provided. The processor 610 determines, according to the formula (1), a time resource number $\tilde{n}(n_{group})$ occupied by the data signal in a time resource group $n_{group}$.

It should be understood that, the time resource adjustment value $f(n_{group})$ may be a random number, or any value determined in another manner. This is not limited in this embodiment of the present invention.

Optionally, when $N_{group}=1$, $f(n_{group})=0$, and when $N_{group} \geq 2$, the time resource adjustment value $f(n_{group})$ is determined according to the formula (2a) or (2b).

Optionally, when $N_{group}=1$, $f(n_{group})=0$, and when $N_{group} \geq 2$, the time resource adjustment value $f(n_{group})$ is determined according to the formula (3a) or (3b).

Optionally, when $N_{group}=1$, $f(n_{group})=0$, when $N_{group}=2$, the time resource adjustment value $f(n_{group})$ is determined according to the formula (3a) or (3b), and when $N_{group}>2$, the time resource adjustment value $f(n_{group})$ is determined according to the formula (4a) or (4b).

In addition, in the foregoing embodiment, referring to Table 1, time resources whose time resource numbers are different are used to send the data signal in the five time resource groups, and therefore, such an unfixed time resource interval is helpful in randomizing inter-cell interference.

Optionally, the multiple time resource numbers indicated by the indication signal are time resource numbers of the time resources occupied by the data signal in the N time resource groups, and the processor 610 obtains time resource pool information, where the time resource pool information includes a time resource pool sequence number, and time resources in a time resource pool corresponding to the time resource pool sequence number are equal to a sum of time resources in the N time resource groups; and determines, according to the formula (6), a time resource number $\tilde{n}(n_{pool})$ that is in each time resource group and occupied by the data signal in a time resource pool $n_{pool}$.

Specifically, referring to Table 1, for example, if 10 bits in the RPT field are 0001101110, it indicates that five subframes such as a time resource number 0 in a time resource group 0, a time resource number 1 in a time resource group 1, a time number 2 in a time resource group 2, a time resource number 3 in a time resource group 3, and a time resource number 2 in a time resource group 4 are used to send the data signal, that is, the multiple time resource numbers indicated by the indication signal are time resource numbers of the time resources occupied by the data signal in the N time resource groups.

It should be understood that, after time resources are grouped by using the sum of the time resources in the N time resource groups as a time resource pool, if time resources indicated by the 10 bits 0001101110 in the RPT field are used to send the data signal in all time resource pools, such a fixed time resource interval is not helpful in randomizing inter-cell interference. For example, if two user equipments in two cells both use time resources indicated by 10 bits 0001101110 in the foregoing RPT field, to send data signals, the data signals of the two user equipments always collide with each other.

To overcome the problem that exists in the foregoing embodiment, another embodiment is provided. When $N_{pool}=1$, $f(n_{pool})=0$, and when $N_{pool} \geq 2$, the time resource adjustment value $f(n_{pool})$ is determined according to the formula (7a) or (7b).

Optionally, when $N_{pool}=1$, $f(n_{pool})=0$, and when $N_{pool} \geq 2$, the time resource adjustment value $f(n_{pool})$ is determined according to the formula (8a) or (8b).

Optionally, when $N_{pool}=1$, $f(n_{pool})=0$, when $N_{pool}=2$, the time resource adjustment value $f(n_{pool})$ is determined according to the formula (8a) or (8b), and when $N_{pool}>2$, the time resource adjustment value $f(n_{pool})$ is determined according to the formula (9a) or (9b).

In addition, in the foregoing embodiment, time resources corresponding to different time resource numbers in the N time resource groups are used to send the data signal in each time resource pool, and therefore, such an unfixed time resource interval is helpful in randomizing inter-cell interference.

Optionally, an initialization sequence of the pseudo-random sequence $c(k)$ is $c_{init}=N_{ID}^{cell}$, or $c_{init}=510$, or $c_{init}=2^9 \cdot \text{mod}(n_f, 4)+N_{ID}^{cell}$, or $c_{init}=2^9 \cdot \text{mod}(n_f, 4)+510$, where $N_{ID}^{cell}$ is a physical cell identifier, and $n_f$ is a system frame number.

Optionally, the processor 610 obtains the time resource grouping information according to a correspondence between a time resource number and a time resource, where the correspondence between a time resource number and a time resource is preset, or is fed back by a transmit end, or is provided by a third party, for example, a base station.

Optionally, the time resource grouping information includes: the time resources, for example, 20 subframes, are grouped into N groups, for example, five groups, each time resource group includes k time resources, where k is a positive integer, and time resource numbers in each time resource group are n=0, 1, . . . , k−1.

According to this embodiment of the present invention, the receiver 640 receives a correspondence between a time resource number and a time resource.

Optionally, the processor 610 determines, according to a correspondence between a time resource number and a time resource that are occupied by the data signal in the N time resource groups, the time resources corresponding to the resource numbers, and obtains the data signal on the time resources occupied by the data signal in the N time resource groups, where the correspondence between a time resource number and a time resource that are occupied by the data signal in the N time resource groups is preset, or is obtained from a transmit end, or is obtained from a third party, for example, a base station.

Therefore, in this embodiment of the present invention, a time resource bearing a data signal can be accurately indicated. Therefore, a receive end can receive the data signal without performing blind detection, which reduces a processing time and energy consumption of the receive end.

It should be understood that in this embodiment of the present invention, the processor 610 may be a central processing unit (Central Processing Unit, CPU for short), or the processor 610 may be another general-purpose processor, a digital signal processor (DSP), an application-specific integrated circuit (ASIC), a field programmable gate array (FPGA), or another programmable logic device, discrete gate or transistor logic device, discrete hardware component, or the like. The general-purpose processor may be a microprocessor, or the processor may be any conventional processor, or the like.

The memory 620 may include a read-only memory and a random access memory, and provide an instruction and data to the processor 610. A part of the memory 620 may further include a non-volatile random access memory. For example, the memory 620 may further store device type information.

The bus system 630 may include a power bus, a control bus, a status signal bus, and the like in addition to a data bus. However, for clear description, various types of buses are marked as the bus system 630 in the figure.

In an implementation process, the steps in the foregoing methods may be completed by using an integrated logic circuit of hardware in the processor 610 or an instruction in a form of software. The steps in the method disclosed with reference to the embodiments of the present invention may be directly performed by a hardware processor, or may be performed by using a combination of hardware in the processor and a software module. A software module may be located in a mature storage medium in the art, such as a random access memory, a flash memory, a read-only memory, a programmable read-only memory, an electrically erasable programmable memory, a register, or the like. The storage medium is located in the memory 620, and the processor 610 reads information from the memory 620 and completes the steps in the foregoing methods in combination with hardware in the processor. To avoid repetition, details are not described herein again.

It should also be understood that the user equipment 500 and the user equipment 600 according to the embodiments of the present invention may be corresponding to the second user equipment in the data transmission method in the embodiments of the present invention. The foregoing and other operations and/or functions of the modules in the user equipment 500 and the user equipment 600 are separately used to implement corresponding procedures of the methods in FIG. 2. For brevity, details are not described herein.

In addition, a computer readable medium (or medium) is further provided, and includes a computer readable instruction for performing the following operation when the instruction is being executed: performing the operations of S210 to S240 in the method in the foregoing embodiment.

In addition, a computer program product is further provided, and includes the foregoing computer readable medium.

It should be noted that, the signal mentioned in this specification includes but is not limited to an indication, information, signaling, or a message. This is not limited herein.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that, in the embodiments of the present invention, the sequence numbers of the foregoing processes do not imply an execution order. The execution order of the processes shall be determined by using functions and internal logic of the processes, and the sequence numbers shall not constitute any limitation on an implementation process of the embodiments of the present invention.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions in the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions in the present invention essentially, or the part contributing to the prior art, or some of the technical solutions may be implemented in a form of a software product. The software product is stored in a storage medium, and includes instructions for instructing a computer device (which may be a personal computer, a server, or a network device) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A data transmission method, comprising:
   obtaining, by first user equipment, time resource grouping information, wherein the time resource grouping information comprises time resource numbers in N time resource groups, and N is a positive integer;
   sending, by the first user equipment, an indication signal, wherein the indication signal indicates one or more time resource numbers;
   determining, by the first user equipment according to the time resource grouping information and the one or more time resource numbers indicated by the indication signal, time resources occupied by a data signal in the N time resource groups; and
   sending, by the first user equipment, the data signal by using the time resources occupied by the data signal in the N time resource groups,
   wherein the determining, by the first user equipment according to the time resource grouping information and the one or more time resource numbers indicated by the indication signal, time resources occupied by the data signal in the N time resource groups comprises:
   determining, by the first user equipment according to a formula $ñ(n_{group}) = \mod(ñ_{RPT} + f(n_{group}), N_{group})$, a time resource number $ñ(n_{group})$ occupied by the data signal in a time resource group $n_{group}$, wherein mod( ) is a mod function, $n_{group}$ is a time resource group sequence number, a value of $n_{group}$ is zero or a positive integer, $ñ_{RPT}$ is any time resource number in the one or more time resource numbers indicated by the indication signal, a value of $ñ_{RPT}$ is zero or a positive integer, $N_{group}$ is a quantity of time resources in the time resource group $n_{group}$, a value of $N_{group}$ is a positive integer, and f($n_{group}$) is a time resource adjustment value in the time resource group $n_{group}$ having a value other than zero when $N_{group} \geq 2$.

2. The method according to claim 1, wherein when $N_{group}=1$, $f(n_{group})=0$, and when $N_{group} \geq 2$, $$f(n_{group}) = \mod\left(\sum_{k=n_{group} \cdot M}^{n_{group} \cdot M + M - 1} c(k) \times 2^{k - (n_{group} \cdot M)}, N_{group}\right),$$

or $$f(n_{group}) = \sum_{k=n_{group} \cdot M}^{n_{group} \cdot M + M - 1} c(k) \times 2^{k - (n_{group} \cdot M)},$$

wherein M is a positive integer not less than $\log_2^{N_{group}}$, and c(k) is a pseudo-random sequence.

3. The method according to claim 1, wherein when $N_{group}=1$, $f(n_{group})=0$, and when $N_{group} \geq 2$, $$f(n_{group}) = \mod\left(f(n_{group}-1) + \sum_{k=n_{group} \cdot M}^{n_{group} \cdot M + M - 1} c(k) \times 2^{k - (n_{group} \cdot M)}, N_{group}\right),$$

or $$f(n_{group}) = f(n_{group}-1) + \sum_{k=n_{group} \cdot M}^{n_{group} \cdot M + M - 1} c(k) \times 2^{k - (n_{group} \cdot M)},$$

wherein M is a positive integer not less than $\log_2^{n_{group}}$, c(k) is a pseudo-random sequence, and f(−1)=0.

4. The method according to claim 3, wherein when $N_{group} > 2$, $$f(n_{group}) = \mod\left(f(n_{group}-1) + \mod\left(\sum_{k=n_{group} \cdot M}^{n_{group} \cdot M + M - 1} c(k) \times 2^{k - (n_{group} \cdot M)}, N_{group} - L\right) + L, N_{group}\right),$$

or $$f(n_{group}) = f(n_{group}-1) + \mod\left(\sum_{k=n_{group} \cdot M}^{n_{group} \cdot M + M - 1} c(k) \times 2^{k - (n_{group} \cdot M)}, N_{group} - L\right) + L,$$

wherein L is a positive integer, and is $1 \leq L < N_{group}$.

5. The method according to claim 1, wherein the multiple time resource numbers indicated by the indication signal are time resource numbers of the time resources occupied by the data signal in the N time resource groups, and the method further comprises:
   obtaining, by the first user equipment, time resource pool information, wherein the time resource pool information comprises a time resource pool sequence number, and time resources in a time resource pool corresponding to the time resource pool sequence number are equal to a sum of time resources in the N time resource groups, and determining, according to a formula $ñ(n_{pool}) = \mod(ñ_{RPT} + f(n_{pool}), N_{pool})$, a time resource number $ñ(n_{pool})$ that is in each time resource group and occupied by the data signal in a time resource pool $n_{pool}$, wherein mod( ) is a mod function, $n_{pool}$ is a time resource pool sequence number, a value of $n_{pool}$ is zero or a positive integer, $ñ_{RPT}$ is any time resource number in the multiple time resource numbers indicated by the indication signal, a value of $ñ_{RPT}$ is zero or a positive integer, $N_{pool}$ is a quantity of all possible time resource numbers that are in the time resource groups and occupied by the data signal in the time resource pool $n_{pool}$, a value of $N_{pool}$ is a positive integer, and $f(n_{pool})$ is a time resource adjustment value in the time resource pool $n_{pool}$.

6. The method according to claim 5, wherein when $N_{pool}=1$, $f(n_{pool})=0$, and when $N_{pool} \geq 2$, $$f(n_{pool}) = \mod\left(\sum_{k=n_{pool} \cdot M}^{n_{pool} \cdot M + M - 1} c(k) \times 2^{k - (n_{pool} \cdot M)}, N_{pool}\right),$$

or $$f(n_{pool}) = \sum_{k=n_{pool} \cdot M}^{n_{pool} \cdot M + M - 1} c(k) \times 2^{k - (n_{pool} \cdot M)},$$

wherein M is a positive integer not less than $\log_2^{N_{pool}}$, and c(k) is a pseudo-random sequence.

7. The method according to claim 5, wherein when $N_{pool}=1$, $f(n_{pool})=0$, and when $N_{pool} \geq 2$, $$f(n_{pool}) = \mod\left(f(n_{pool}-1) + \sum_{k=n_{pool} \cdot M}^{n_{pool} \cdot M + M - 1} c(k) \times 2^{k - (n_{pool} \cdot M)}, N_{pool}\right),$$

or $$f(n_{pool}) = f(n_{pool}-1) + \sum_{k=n_{pool} \cdot M}^{n_{pool} \cdot M + M - 1} c(k) \times 2^{k - (n_{pool} \cdot M)},$$

wherein M is a positive integer not less than $\log_2^{N_{pool}}$, c(k) is a pseudo-random sequence, and f(−1)=0.

8. The method according to claim 7, wherein when $N_{pool}>2$, $$f(n_{pool}) = \text{mod}\left(f(n_{pool}-1) + \text{mod}\left(\sum_{k=n_{pool}\cdot M}^{n_{pool}\cdot M+M-1} c(k) \times 2^{k-(n_{pool}\cdot M)}, N_{pool}-L\right) + L, N_{pool}\right), \text{ or}$$

$$f(n_{pool}) = f(n_{pool}-1) + \text{mod}\left(\sum_{k=n_{pool}\cdot M}^{n_{pool}\cdot M+M-1} c(k) \times 2^{k-(n_{pool}\cdot M)}, N_{pool}-L\right) + L,$$

wherein L is a positive integer, and is $1 \leq L < N_{pool}$.

9. The method according to claim 1, wherein time resource numbers of the time resources occupied by the data signal in the N time resource groups are the same.

10. User equipment, comprising:
at least one memory; and
at least one processor connected to the memory and configured to execute one or more programs or instructions stored in the at least one memory to:
obtain time resource grouping information, wherein the time resource grouping information comprises time resource numbers in N time resource groups, and N is a positive integer;
send an indication signal, wherein the indication signal indicates one or more time resource numbers;
determine, according to the time resource grouping information and the one or more time resource numbers indicated by the indication signal, time resources occupied by a data signal in the N time resource groups; and
send the data signal by using the time resources occupied by the data signal in the N time resource groups,
wherein
the at least one processor is further configured to determine, according to a formula $ñ(n_{group})=\text{mod}(ñ_{RPT}+f(n_{group}), N_{group})$ a time resource number $ñ(n_{group})$ occupied by the data signal in a time resource group $n_{group}$ wherein mod( ) is a mod function, $n_{group}$ is a time resource group sequence number, a value of $n_{group}$ is zero or a positive integer, $ñ_{RPT}$ is any time resource number in the one or more time resource numbers indicated by the indication signal, a value of $ñ_{RPT}$ is zero or a positive integer, $N_{group}$ is a quantity of time resources in the time resource group $n_{group}$, a value of $N_{group}$ is a positive integer, and $f(n_{group})$ is time resource adjustment value in the time resource group $n_{group}$ having a value other than zero when $N_{group} \geq 2$.

11. The user equipment according to claim 10, wherein when $N_{group}=1$, $f(n_{group})=0$, and when $N_{group} \geq 2$, $$f(n_{group}) = \text{mod}\left(\sum_{k=n_{group}\cdot M}^{n_{group}\cdot M+M-1} c(k) \times 2^{k-(n_{group}\cdot M)}, N_{group}\right), \text{ or}$$

$$f(n_{group}) = \sum_{k=n_{group}\cdot M}^{n_{group}\cdot M+M-1} c(k) \times 2^{k-(n_{group}\cdot M)},$$

wherein M is a positive integer not less than $\log_2^{N_{group}}$, and c(k) is a pseudo-random sequence.

12. The user equipment according to claim 10, wherein when $N_{group}=1$, $f(n_{group})=0$, and when $N_{group} \geq 2$, $$f(n_{group}) = \text{mod}\left(f(n_{group}-1) + \sum_{k=n_{group}\cdot M}^{n_{group}\cdot M+M-1} c(k) \times 2^{k-(n_{group}\cdot M)}, N_{group}\right),$$

or $$f(n_{group}) = f(n_{group}-1) + \sum_{k=n_{group}\cdot M}^{n_{group}\cdot M+M-1} c(k) \times 2^{k-(n_{group}\cdot M)},$$

wherein M is a positive integer not less than $\log_2^{N_{group}}$, c(k) is a pseudo-random sequence, and $f(-1)=0$.

13. The user equipment according to claim 12, wherein when $N_{group}>2$, $$f(n_{group}) = \text{mod}\left(f(n_{group}-1) + \text{mod}\left(\sum_{k=n_{group}\cdot M}^{n_{group}\cdot M+M-1} c(k) \times 2^{k-(n_{group}\cdot M)}, N_{group}-L\right) + L, N_{group}\right), \text{ or}$$

$$f(n_{group}) = f(n_{group}-1) + \text{mod}\left(\sum_{k=n_{group}\cdot M}^{n_{group}\cdot M+M-1} c(k) \times 2^{k-(n_{group}\cdot M)}, N_{group}-L\right) + L,$$

wherein L is a positive integer, and is $1 \leq L < N_{group}$.

14. The user equipment according to claim 10, wherein the multiple time resource numbers indicated by the indication signal are time resource numbers of the time resources occupied by the data signal in the N time resource groups; and
the at least one processor is further configured to:
obtain time resource pool information, wherein the time resource pool information comprises a time resource pool sequence number, and time resources in a time resource pool corresponding to the time resource pool sequence number are equal to a sum of time resources in the N time resource groups; and
determine, according to a formula $ñ(n_{pool})=\text{mod}(ñ_{RPT}+f(n_{pool}), N_{pool})$, a time resource number $(n_{pool})$ that is in each time resource group and occupied by the data signal in a time resource pool $n_{pool}$, wherein mod( )is a mod function, $n_{pool}$ is a time resource pool sequence number, a value of $n_{pool}$ is zero or a positive integer, $ñ_{RPT}$ is any time resource number in the multiple time resource numbers indicated by the indication signal, a value of $ñ_{RPT}$ is zero or a positive integer, $N_{pool}$ is a quantity of all possible time resource numbers that are in the time resource groups and occupied by the data signal in the time resource pool $n_{pool}$, a value of $N_{pool}$ is a positive integer, and $f(n_{pool})$ is a time resource adjustment value in the time resource pool $n_{pool}$.

15. The user equipment according to claim 14, wherein when $N_{pool}=1$, $f(n_{pool})=0$, and when $N_{pool} \geq 2$, $$f(n_{pool}) = \text{mod}\left(\sum_{k=n_{pool}\cdot M}^{n_{pool}\cdot M+M-1} c(k) \times 2^{k-(n_{pool}\cdot M)}, N_{pool}\right), \text{ or}$$

$$f(n_{pool}) = \sum_{k=n_{pool}\cdot M}^{n_{pool}\cdot M+M-1} c(k) \times 2^{k-(n_{pool}\cdot M)},$$

wherein M is a positive integer not less than $\log_2^{N_{pool}}$, and c(k) is a pseudo-random sequence.

16. The user equipment according to claim 14, wherein when $N_{pool}=1$, $f(n_{pool})=0$, and when $N_{pool} \geq 2$, $$f(n_{pool}) = \text{mod}\left(f(n_{pool}-1) + \sum_{k=n_{pool} \cdot M}^{n_{pool} \cdot M + M - 1} c(k) \times 2^{k-(n_{pool} \cdot M)}, N_{pool}\right), \text{ or}$$

$$f(n_{pool}) = f(n_{pool}-1) + \sum_{k=n_{pool} \cdot M}^{n_{pool} \cdot M + M - 1} c(k) \times 2^{k-(n_{pool} \cdot M)},$$

wherein M is a positive integer not less than $\log_2^{N_{pool}}$, $c(k)$ is a pseudo-random sequence, and $f(-1)=0$.

17. The user equipment according to claim 16, wherein when $N_{pool} > 2$, $$f(n_{pool}) = \text{mod}\Bigg(f(n_{pool}-1) + \text{mod}\left(\sum_{k=n_{pool} \cdot M}^{n_{pool} \cdot M + M - 1} c(k) \times 2^{k-(n_{pool} \cdot M)}, N_{pool} - L\right) + L, N_{pool}\Bigg), \text{ or}$$

$$f(n_{pool}) = f(n_{pool}-1) + \text{mod}\left(\sum_{k=n_{pool} \cdot M}^{n_{pool} \cdot M + M - 1} c(k) \times 2^{k-(n_{pool} \cdot M)}, N_{pool} - L\right) + L,$$

wherein L is a positive integer, and is $1 \leq L < N_{pool}$.

18. The user equipment according to claim 10, wherein time resource numbers of the time resources occupied by the data signal in the N time resource groups are the same.

19. The method according to claim 2, wherein an initialization sequence of the pseudo-random sequence $c(k)$ is $c_{init}=N_{ID}^{cell}$, or $c_{init}=510$, or $c_{init}=2^9 \cdot \text{mod}(n_f, 4)+N_{ID}^{cell}$, or $c_{init}=2^9 \cdot \text{mod}(n_f, 4)+510$, where $N_{ID}^{cell}$ is a physical cell identifier, and $n_f$ is a system frame number.

20. The user equipment according to claim 11, wherein an initialization sequence of the pseudo-random sequence $c(k)$ is $c_{init}=N_{ID}^{cell}$, or $c_{init}=510$, or $c_{init}=2^9 \cdot \text{mod}(n_f, 4)+N_{ID}^{cell}$, or $c_{init}=2^9 \cdot \text{mod}(n_f, 4)+510$, where $N_{ID}^{cell}$ is a physical cell identifier, and $n_f$ is a system frame number.

* * * * *